United States Patent Office 3,647,782
Patented Mar. 7, 1972

3,647,782
BIS (3,3-DICHLORO-2-OXO-POLYMETHYLENE-
IMINES)
Joseph C. Collins, East Greenbush, N.Y., assignor to
Sterling Drug Inc., New York, N.Y.
No Drawing. Continuation-in-part of application Ser. No.
673,926, Oct. 9, 1967. This application Sept. 29, 1969,
Ser. No. 862,084
Claims priority, application Great Britain, Oct. 1, 1968,
46,633/68
Int. Cl. C07d 41/06
U.S. Cl. 260—239.3 R         8 Claims

ABSTRACT OF THE DISCLOSURE

The invention relates to 3,3 - dichloro-2-oxopolymeth-
ylenimines and bis(3,3 - dichloro - 2-oxopolymethylen-
imines) having useful anti-inflammatory properties as
determined by their inhibition of carrageenan induced
edema in rats.

The application is a continuation-in-part of prior co-
pending application, Ser. No. 673,926, filed Oct. 9, 1967,
now U.S. Pat. 3,549,654 issued Dec. 22, 1970.

This invention relates to 3,3-dichloro-2-oxopolymeth-
ylenimine derivatives and bis(3,3 - dichloro - 2-oxopoly-
methylenimine) derivatives.

Accordng to one aspect of the invention there is pro-
vided the compounds having the Formula I

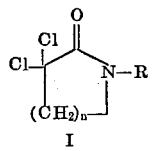

where R is one of the group consisting of phenyl-lower-
alkyl, 3-indolyl-lower-alkyl, phenyl, naphthyl, 5,6,7,8-
tetrahydronaphthyl, fluorenyl, 9-oxofluorenyl, pyridyl,
pyrimidinyl and benzothiazolyl radicals, and such radi-
cals substituted by from one to three substituents of the
group consisting of halo, lower-alkyl, phenyl-lower-alkyl,
lower-alkoxy, phenyl-lower-alkoxy, phenoxy, lower-alkyl-
mercapto, lower-alkylsulfonyl, trihalomethyl, nitro, di
(lower-alkyl)amino. lower-alkanoylamino, amino, lower-
alkanoyloxy and hydroxy; and $n$ is a number from 1 to 3
inclusive.

In the compounds of the invention having the Formula
I above, when the radicals represented by R are sub-
stituted, as described hereinabove, by more than one sub-
stituent, such substituents can be the same or different
and they can be in any of the various position combina-
tions relative to each other.

According to another aspect of the invention there is
provided the compounds having the Formula II

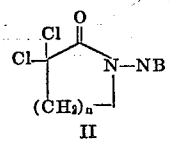

wnere NB is one of the group consisting of 1-pyrrolidinyl,
1-piperidinyl, 4 - lower-alkyl-1-piperazinyl, 4-benzyl-1-
piperazinyl, 4-phenyl-1-piperazinyl, 4-morpholinyl and 4-
thiomorpholinyl, or NB is NR'R" where R' and R",
which can be the same or different, are lower-alkyl,
benzyl, phenyl, or phenyl substituted by from one to three
substituents of the group consisting of halo, lower-alkyl,
lower-alkoxy, trihalomethyl and nitro; and $n$ is a num-
ber from 1 to 3 inclusive.

In the compound of Formula II above, when phenyl
is substituted, as described above, by more than one sub-
stituent, such substituents can be the same or different
and they can be in any of the various position combina-
tions relative to each other.

According to another aspect of the invention there is
provided the compounds having the Formula III

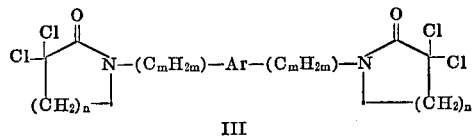

where Ar is phenylene, biphenylylene, or phenylene or bi-
phenylylene substituted by from one to three substituents
of the group consisting of halo, lower-alkyl, phenyl-
lower-alkyl, lower-alkoxy, phenyl-lower-alkoxy, phenoxy,
lower-alkylmercapto, lower-alkylsulfonyl, trihalomethyl,
nitro, di(lower - alkyl)amino, lower - alkanoylamino,
amino, lower alkanoyloxy, and hydroxy; $m$ is a number
from 0 to 3 inclusive; and $n$ is a number from 1 to 3
inclusive.

In the compounds of the invention having the For-
mula III above, when phenylene or biphenylylene, rep-
resented by Ar, are substituted, as described hereinabove,
by more than one substituent, such substituents can be
the same or different and they can be in any of the various
position combinations relative to each other.

According to another aspect of the invention there is
provided the compounds having the Formula IV

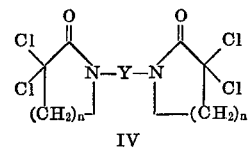

where Y is alkylene having from two to twelve carbon
atoms, and $n$ is a number from 1 to 3 inclusive.

In Formula I above where R is phenyl-lower-alkyl or
phenyl-lower-alkyl substituted as hereinbefore defined
for the radicals represented by R, the term "phenyl-
lower-alkyl" means a group wherein lower-alkyl contains
from one to six carbon atoms which can be arranged as
straight or branched chains, which without limiting the generality of the foregoing is illustrated by phenylmethyl, 2-phenyl - 1 - ethyl, 3 - phenyl-1-propyl, 2-phenyl-1-propyl, 4 - phenyl-1-butyl, 4-phenyl-2-butyl, 5-phenyl-1-amyl, 6-phenyl-1-hexyl, and the like.

In Formula I above where R is 3-indolyl-lower-alkyl or 3-indolyl-lower-alkyl substituted as hereinbefore defined for the radicals represented by R, and term "3-indolyl-lower-alkyl" means a group wherein lower-alkyl contains from one to three carbon atoms which can be arranged as straight or branched chains, which without limiting the generality of the foregoing is illustrated by (3-indoyl)methyl, 2-(3-indolyl)-1-ethyl, 3-(3-indolyl)-1-propyl, 2-(3-indolyl)-1-propyl, and the like.

The divalent aromatic radicals as represented by Ar in Formula III can have each of their two connecting linkages bound to any available carbon atom of the aromatic rings such that they can be in any of the various position combinations relative to each other.

In the above Formula III, when $m$ is 0, the nitrogen atoms are each linked directly to a ring carbon atom of the radicals represented by Ar.

In the above Formula III, where $m$ is a number from 1 to 3 inclusive, $C_mH_{2m}$ represents lower-alkylene as illustrated by —CH$_2$—, —CH$_2$CH$_2$—, —CH$_2$CH$_2$CH$_2$—, —CH(CH$_3$)CH$_2$—,

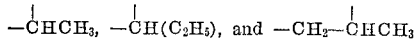

In Formula IV above, Y represents alkylene having its connecting linkages on different carbon atoms as illustrated by —CH$_2$CH$_2$—, —CH$_2$CH$_2$CH$_2$—,

—(CH$_2$)$_4$—, —(CH$_2$)$_5$—, —(CH$_2$)$_6$—, —(CH$_2$)$_8$—

—(CH$_2$)$_{10}$—, —(CH$_2$)$_{12}$—, —CH(CH$_3$)CH$_2$—

—C(CH$_3$)$_2$CH$_2$—

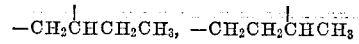

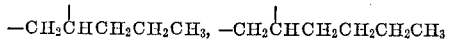

—CH$_2$CH(CH$_3$)CH(CH$_3$)CH$_2$CH$_2$CH$_2$—, and the like.

The term "halo," as used hereinabove and throughout this specification, includes chloro, bromo, iodo and fluoro.

The terms "lower-alkyl," "lower-alkanoyloxy," "lower-alkanoyl," and "lower-alkoxy," as used hereinabove and throughout this specification, mean such groups preferably containing from one to six carbon atoms which can be arranged as straight or branched chains, and without limiting the generality of the foregoing, are illustrated by methyl, ethyl, propyl, isopropyl, butyl, sec-butyl, amyl, hexyl, acetoxy, propionoxy, trimethylacetoxy, acetyl, propionyl, trimethylacetyl, methoxy, ethoxy, isobutoxy, and the like.

The novel compounds of the invention, represented by Formulas I, II, III and IV above, are prepared by cyclization of the corresponding ω-chloroalkanoic acid amides having the Formulas VA and VB, ω-chloroalkanoic acid hydrazides having the Formulas VIA and VIB, and bis(ω-chloroalkanoic acid amides) having the Formulas IXA and IXB and the Formulas XIA and XIB and further reacting the resulting cyclized compounds of Formulas VIIB, VIIIB, XB, and XIIB with a chlorinating agent so as to dichlorinate the ring carbon atom vicinal to each ring carbonyl group.

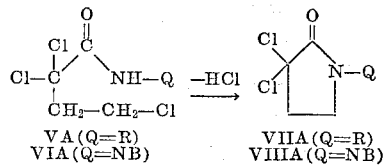

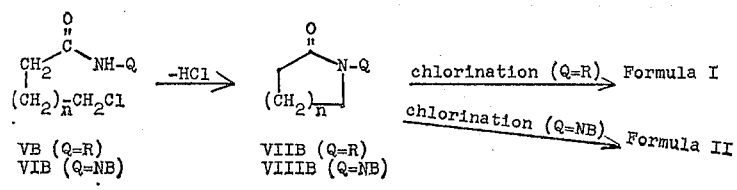

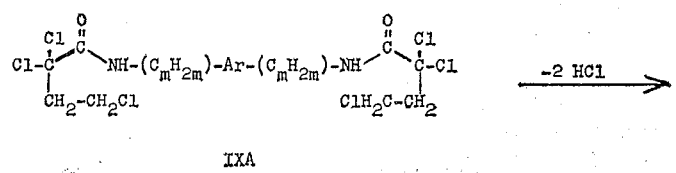

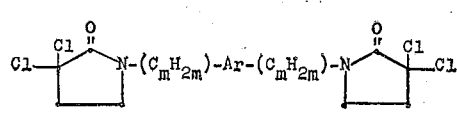

XA

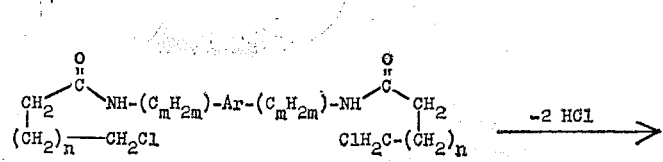

IXB

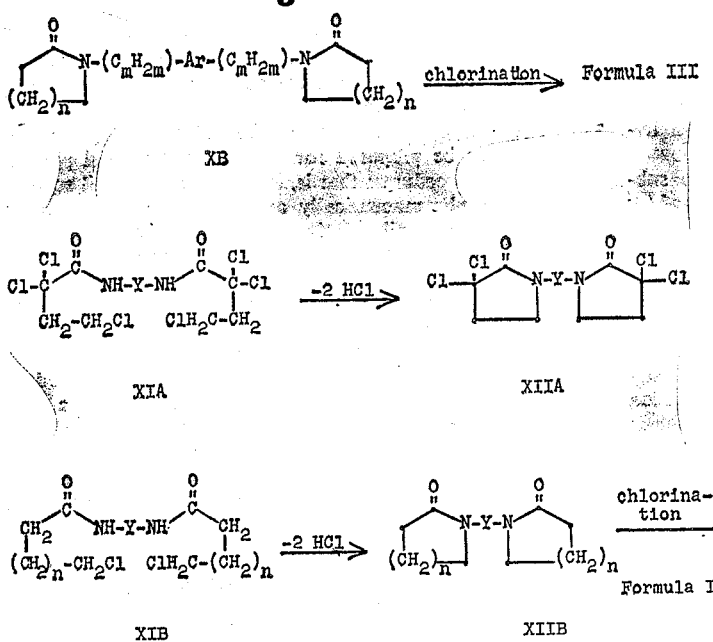

where R, NB, Ar, $m$ and $n$, and Y have the meaning hereinbefore defined for R of Formula I; NB of Formula II; Ar, $m$ and $n$ of Formula III; and Y of Formula IV respectively, except that the radicals represented by R and Ar cannot bear amino and/or hydroxy substituents, such substituents being introduced as described hereinbelow.

The cyclization reaction is advantageously performed in a suitable solvent in the presence of at least a stoichiometric amount of an acid-acceptor and in a temperature range of from about 5° C. to 80° C.

The cyclization of the ω-chloroalkanoic acid amides of Formula VA and Formula VB where $n$ is a number from 1 to 2 inclusive, the ω-chloroalkanoic acid hydrazides of Formula VIA and Formula VIB where $n$ is a number from 1 to 2 inclusive and the bis(ω-chloroalkanoic acid amides) of Formulas IXA and XIA and Formulas IXB and XIB where $n$ is a number from 1 to 2 inclusive is preferably carried out at room temperature in methyl or ethyl alcohol in the presence of a stoichiometric amount of slight excess of sodium hydroxide.

The cyclization of the ω-chloroalkanoic acid amides of Formula VB where $n$ is the number 3 and the ω-chloroalkanoic acid hydrazides of Formula VIB, where $n$ is the number 3 and the bis(ω-chloroalkanoic acid amides) of Formulas IXB and XIB, where $n$ is the number 3, is preferably carried out in dimethyl sulfoxide in the presence of a stoichiometric amount or slight excess of potassium tert-butoxide at a temperature of from about 20° C. to 80° C.

The compounds of Formula VIIB, Formula VIIIB, Formula XB and Formula XIIB can be converted to the corresponding compounds of Formula I, Formula II, Formula III and Formula IV respectively by reaction in a suitable solvent, e.g., xylene, benzene or chloroform, with a suitable chlorinating agent, e.g., chlorine gas in the presence of either phosphorus trichloride or phosphorus pentachloride; sulfuryl chloride in the presence of phosphorus pentachloride; or phosphorus pentachloride Depending on the chlorinating agent and solvent used the reaction temperature can range from about 15° to 120° C. and the reaction time can range from about one-half hour to about twenty-four hours. The preferred reaction is carried out with at least one equivalent of phosphorus pentachloride. The reaction is conveniently carried out by suspending three to four equivalents of phosphorus pentachloride in a suitable solvent, adding a solution of the appropriate 2-oxocyclomethylenimine or bis(2-oxocyclomethylenimine) in a suitable solvent and finally heating in the range of about 50° to about 100° C. The following general procedure illustrates the preferred method:

A solution of the appropriate 2-oxocyclomethylenimine derivative (0.10 mole) or bis(2-oxocyclomethylenimine) (0.10 mole) in 150 ml. xylene is added dropwise during one hour to a stirred suspension of three equivalents of phosphorus pentachloride in 200 ml. xylene at room temperature. The mixture is heated during one hour to 80° to 90° C. and heating is continued for one-half hour. The mixture is evaporated to dryness under reduced pressure and the residue is stirred with excess aqueous sodium carbonate solution. The reulting insoluble material is collected and recrystallized from a suitable solvent to give the corresponding 3,3-dichloro-2-oxopolymethylenimine derivative, or bis(3,3-dichloro-2-oxopolymethylenimine) respectively.

The intermediate ω-chloroalkanoic acid amides having the Formula VA and VB, ω-chloroalkanoic acid hydrazides VIA and VIB, and the bis(ω-chloroalkanoic acid amides) having the Formulas IXA, IXB, XIA and XIB are prepared by reacting the corresponding amines having the Formula R—NH$_2$ (XIII), hydrazines having the Formula H$_2$N—NB (XIV) and di-amines having the formulas H$_2$N—(C$_m$H$_{2m}$)—Ar—(C$_m$H$_{2m}$)—NH$_2$ (XV) and H$_2$N—Y—NH$_2$ (XVI), where R, NB, Ar and $m$, and Y have the meaning hereinbefore defined for R of Formula VA; NB of Formula II; Ar and $m$ of Formula IXA; and Y of Formula IV respectively, which belong to known classes of compounds with the appropriate amount of the known acid chloride, 2,2,4-trichlorobutyryl chloride, or the known acid chloride having the formula ClCH$_2$(CH$_2$)$_n$CH$_2$COCl (XVII), where $n$ is the number from 1 to 3 inclusive, that is, 4-chlorobutyryl chloride, 5-chlorovaleryl chloride and 6-chlorohexanoyl chloride, in a suitable solvent in the presence of at least a stoichiometric amount of an acid-acceptor such as sodium hydroxide, sodium carbonate, or triethylamine and at a temperature range from about 0° to 25° C.

The reaction is preferably carried out by dissolving an appropriate amine having the Formula XIII, hydrazine having the Formula XIV, or di-amine having the Formulas XV or XVI, in benzene, methylene dichloride or ethylene dichloride, adding an excess of triethylamine or a stoichiometric amount of aqueous sodium carbonate or sodium hydroxide, cooling to 5° to 10° C., and gradually adding a stoichiometric amount or slight excess of the appropriate acid chloride.

The compounds of Formula I where the radicals represented by R are substituted by one or more amino and/or hydroxy substituents, and the compounds of Formula III where Ar is substituted by one or more amino and/or hydroxy substituents are prepared, by well known hydrolysis procedures, from the corresponding compounds where the radicals represented by R and Ar are substituted by one or more lower-alkanoylamino and/or lower-alkanoyloxy substituents, whereby said substituents are converted to amino and/or hydroxy substituents.

In the case of a lower-alkanoylamino substituent, e.g. an acetamido substituent, the hydrolysis can be carried out at room temperature in ether containing an amount of hydrogen chloride slightly in excess of one equivalent. The amine hydrochloride salt so obtained can be converted to the corresponding free base by neutralization with an equivalent of a suitable acid acceptor.

In the case of a lower-alkanoyloxy substituent, e.g. acetoxy substituent, the hydrolysis can be carried out at room temperature in aqueous methyl alcohol containing an amount of potassium hydroxide slightly in excess of one equivalent.

The hydrazines having the Formula XIV are known componds or are readily prepared from well known, readily available amines having the Formula XVIII (H—NB) by standard procedures, e.g. by nitrosation followed by reduction of the N-nitroso intermediate so obtained.

The following general procedure exemplifies the method:

To a vigorously stirred solution of one mole of amine (H—NB, XVIII) in 145 ml. concentrated hydrochloric acid and 400 g. ice-water is added a solution of one mole sodium nitrite in 250 ml. water during ten minutes, while the reaction temperature is maintained below 10° C. and stirring is continued one hour. The reaction mixture is extracted with a suitable solvent, e.g. benzene and the extract is evaporated to dryness under reduced pressure. The crude N-nitroso compound (ON—NB, XIX) can be purified if desired by well known procedures, e.g. by distillation under reduced pressure or recrystallization. To a vigorously stirred mixture of 4.3 g-atoms of zinc dust in 400 ml. water is added slowly a solution of one mole of the N-nitroso compound in 4.8 moles glacial acetic acid during two hours while the reaction temperature is maintained at 10 to 20° C. Stirring is continued for one hour and the mixture then is warmed to about 80° C. and filtered. The cooled filtrate is treated with an amount of 40% aqueous sodium hydroxide sufficient to redissolve the precipitated zinc hydroxide and then extracted with a suitable solvent, e.g. ether. The extract is evaporated to dryness and the crude product is purified by well known procedures to give the hydrazine of Formula XIV ($H_2N$—NB).

The compounds of the invention, having the Formulas I, II, III and IV above, are therapeutically active substances which possess useful anti-inflammatory properties. The actual determination of the numerical biological data definitive for a particular compound is readily determined by standard test procedures by technicians having ordinary skill in pharmacological test procedures, without the need for any extensive experimentation.

The anti-inflammatory activity of the compounds of the invention having the Formulas I, II, III and IV above, was determined in the carrageenan edema test [Winter et al., Proc. Soc. Exp. Biol. Med. 111, 544–547 (1962)] wherein the test agents were administered orally in multiple doses to fasted male albino rats. One hour after medication five hundredths of one ml. of 0.75% carrageenan was injected into the foot of each rat and three hours after the injections of carrageenan the weight of the foot edema was determined. The calculated difference between the average weight of the control and medicated rats was used as a measure of the degree of inhibition of carrageenan edema due to the administration of the test agent. Consistent, significant inhibition of carrageenan edema was found when the compounds of this invention were administered orally at doses ranging from 25 to 400 mg./kg.

The compounds having the Formulas I, II, III and IV above, can be prepared for use by conventional pharmaceutical procedures; that is, in an aqueous or oil suspension in a pharmaceutically acceptable vehicle (aqueous alcohol, glycol, oil solution, or oil-water emulsion) for parenteral or oral administration; in capsule or tablet form with conventional excipients (for example, calcium carbonate, starch, lactose, talc, magnesium stearate, gum acacia, and the like) for oral administration.

The molecular structures of the compounds of the invention were assigned on the basis of the method of their synthesis and study of their infrared spectra, and confirmed by the correspondence between calculated and found values for the elementary analysis for representative examples.

The invention is illustrated by the following examples:

Example 1.—Method 1

(A) N-(4-chlorophenyl)-2,2,4-trichlorobutyramide

To a stirred, ice-cooled mixture of 4.2 g. sodium hydroxide in 100 ml. water and 12.7 g. 4-chloroaniline in 200 ml. ethylene dichloride was added 21 g. 2,2,4-trichlorobutyryl chloride during fifteen minutes. The mixture was stirred for one-half hour and the precipitate was filtered and washed with water. The filtrate was washed with dilute aqueous hydrochloric acid solution and water, dried over sodium sulfate, and evaporated to dryness to yield N-(4-chlorophenyl)-2,2,4-trichlorobutyramide as a solid which was combined with the crop obtained by filtration and used as such in the next step.

(B) 3,3-dichloro-1-(4-chlorophenyl)-2-pyrrolidinone

To a stirred solution of the N-(4-chlorophenyl)-2,2,4-trichlorobutyramide, from Example 1A, in 200 ml. ethyl alcohol was added a solution of 4.2 g. sodium hydroxide in 42 ml. water. Stirring was continued for ten minutes and dilute aqueous hydrochloric acid solution was added until the solution turned acidic, followed by 300 ml. water. The resulting crystals were filtered to give after recrystallization from carbon tetrachloride 18.4 g. 3,3-dichloro-1-(4-chlorophenyl)-2-pyrrolidinone; M.P. 108.4–109.2° C. (corr.).

METHOD 2

(A) N-(4-chlorophenyl)-4-chlorobutyramide

To a stirred, ice cooled mixture of 25.5 g. of 4-chloroaniline and 25.3 g. triethylamine in 800 ml. dry methylene dichloride was added a solution of 31 g. 4-chlorobutyryl chloride in 300 ml. dry methylene dichloride dropwise during one hour. The resulting solution was allowed to warm to room temperature, washed with 5% aqueous sodium carbonate solution and water, dried over anhydrous calcium sulfate and evaporated to dryness under reduced pressure to give after successive recrystallizations from ethyl acetate-hexane and ethyl alcohol-hexane 17.9 g. N-(4-chlorophenyl)-4-chlorobutyramide; M.P. 100–101° C.

(B) 1-(4-chlorophenyl)-2-pyrrolidinone

To a stirred solution of 11.6 g. N-(4-chlorophenyl)-4-chlorobutyramide in 75 ml. ethyl alcohol was added 5 ml. of a solution of 0.5 g. sodium hydroxide in water and three additional identical sodium hydroxide solutions were added at ten, twenty and forty minute intervals. The solution was allowed to stand for fifteen hours, diluted with 25 ml. water and the resulting crystals were collected by filtration to give after recrystallization from ethyl alcohol-hexane 5.9 g. 1-(4-chlorophenyl)-2-pyrrolidinone; M.P. 96.5–97.5° C.

(C) 3,3-dichloro-1-(4-chlorophenyl)-2-pyrrolidinone

To a stirred slurry of 15.6 phosphorus pentachloride in 65 ml. xylene was added a solution of 4.9 g. 1-(4-chlorophenyl)-2-pyrrolidinone in 40 ml. xylene dropwise during five minutes and the resulting mixture was slowly heated to 80° C. during twenty minutes and heating at 80° C. was continued for forty-five minutes. The solvent was removed under reduced pressure at about 75° C. and the residual viscous oil was stirred with 55 ml. 10% aqueous sodium carbonate and ice. The resulting solid was collected by filtration and washed with water to give after recrystallization from methyl alcohol-water 3.9 g. 3,3-dichloro-1-(4-chlorophenyl)-2-pyrrolidinone; M.P. 112–113° C.

EXAMPLE 2

(A) N-(2-chlorophenyl)-2,2,4-trichlorobutyramide

To a stirred, ice-cooled mixture of 9.5 g. 2-chloroaniline in 100 ml. ethylene dichloride and 3.15 g. sodium hydroxide in 75 ml. water was added 15.8 g. 2,2,4-trichlorobutyryl chloride in 50 ml. ethylene dichloride during one-half hour and stirring was continued one-half hour. The ethylene dichloride phase was separated, washed with dilute aqueous hydrochloric acid and water and evaporated to dryness to yield N-(2-chlorophenyl)-2,2,4-trichlorobutyramide as a yellow oil which was used as such in the next step.

(B) 3,3-dichloro-1-(2-chlorophenyl)-2-pyrrolidinone

To a stirred solution of the N-(2-chlorophenyl)-2,2,4-trichlorobutyramide from Example 2A in 150 ml. ethyl alcohol was added a solution of 3.15 g. sodium hydroxide in 32 ml. water in small portions during one-half hour and stirring was continued for one-half hour. On standing a precipitate formed which was collected by filtration and recrystallized from benzene-hexane to yield 6.9 g. 3,3-dichloro-1-(2-chlorophenyl)-2-pyrrolidinone; M.P. 91–92° C.

Following a procedure similar to that described in Example 2A and substituting for 2-chloroaniline an equivalent amount of:

(a) 4-(n-butyl)aniline
(b) 2-bromo-4,6-dinitroaniline
(c) 3,4-diethoxyaniline
(d) 4-butylmercaptoaniline
(e) 2,4,5-trichloroaniline
(f) 2-bromo-6-chloro-4-nitroaniline
(g) 4-(5-phenylpentyloxy)aniline
(h) 4-phenethyloxyaniline
(i) 2-bromo-4-isopentylaniline
(j) 2,5-dimethyl-4-nitroaniline
(k) 2-butoxyaniline
(l) 2,6-dichloro-4-ethylmercaptoaniline
(m) 4-(tert-butyl)sulfonylaniline
(n) 4-[3-(4-nitrophenyl)propyl]aniline
(o) 4-dimethylaminoaniline
(p) 4-dibutylaminoaniline there can be obtained respectively, according to this invention:

(a) N-[4-(n-butyl)phenyl]-2,2,4-trichlorobutyramide
(b) N-(2-bromo-4,6-dinitrophenyl)-2,2,4-trichlorobutyramide
(c) N-(3,4-diethoxyphenyl)-2,2,4-trichlorobutyramide
(d) N-(4-butylmercaptophenyl)-2,2,4-trichlorobutyramide
(e) N-(2,4,5-trichlorophenyl)-2,2,4-trichlorobutyramide
(f) N-(2-bromo-6-chloro-4-nitrophenyl)-2,2,4-trichlorobutyramide
(g) N-[4-(5-phenylpentyloxy)phenyl]-2,2,4-trichlorobutyramide
(h) N-(4-phenethyloxyphenyl)-2,2,4-trichlorobutyramide
(i) N-(2-bromo-4-isopentylphenyl)-2,2,4-trichlorobutyramide
(j) N-(2,5-dimethyl-4-nitrophenyl)-2,2,4-trichlorobutyramide
(k) N-(2-butoxyphenyl)-2,2,4-trichlorobutyramide
(l) N-(2,6-dichloro-4-ethylmercaptophenyl)-2,2,4-trichlorobutyramide
(m) N-[4-(tert-butyl)sulfonylphenyl]-2,2,4-trichlorobutyramide
(n) N-{4-[3-(4-nitrophenyl)propyl]phenyl}-2,2,4-trichlorobutyramide
(o) N-(4-dimethylaminophenyl)-2,2,4-trichlorobutyramide
(p) N-(4-dibutylaminophenyl)-2,2,4-trichlorobutyramide Following a procedure similar to that described in Example 2A and substituting for 2,2,4-trichlorobutyryl chloride an equivalent amount of 6-chlorohexanoyl chloride there can be obtained:

N-(2-chlorophenyl)-6-chlorohexanamide

Following a procedure similar to that described in Example 2B and substituting for N-(2-chlorophenyl)-2,2,4-trichlorobutyramide and equivalent amount of:

(a) N-[4-(n-butyl)phenyl]-2,2,4-trichlorobutyramide
(b) N-(2-bromo-4,6-dinitrophenyl)-2,2,4-trichlorobutyramide
(c) N-(3,4-diethoxyphenyl)-2,2,4-trichlorobutyramide
(d) N-(4-butylmercaptophenyl)-2,2,4-trichlorobutyramide
(e) N-(2,4,5-trichlorophenyl)-2,2,4-trichlorobutyramide
(f) N-(2-bromo-6-chloro-4-nitrophenyl)-2,2,4-trichlorobutyramide
(g) N-[4-(5-phenylpentyloxy)phenyl]-2,2,4-trichlorobutyramide
(h) N-(4-phenethyloxyphenyl)-2,2,4-trichlorobutyramide
(i) N-(2-bromo-4-isopentylphenyl)-2,2,4-trichlorobutyramide
(j) N-(2,5-dimethyl-4-nitrophenyl)-2,2,4-trichlorobutyramide
(k) N-(2-butoxyphenyl)-2,2,4-trichlorobutyramide
(l) (2,6-dichloro-4-ethylmercaptophenyl)-2,2,4-trichlorobutyramide
(m) N-[4-(tert-butyl)sulfonylphenyl]-2,2,4-trichlorobutyramide
(n) N-{4-[3-(4-nitrophenyl)propyl]phenyl}-2,2,4-trichlorobutyramide
(o) N-(4-dimethylaminophenyl)-2,2,4-trichlorobutyramide
(p) N-(4-dibutylaminophenyl)-2,2,4-trichlorobutyramide
(q) N-(2-chlorophenyl)-6-chlorohexanamide there can be obtained respectively, according to this invention:

(a) 3,3-dichloro-1-[4-(n-butyl)phenyl]-2-pyrrolidinone
(b) 3,3-dichloro-1-(2-bromo-4,6-dinitrophenyl)-2-pyrrolidinone
(c) 3,3-dichloro-1-(3,4-diethoxyphenyl)-2-pyrrolidinone
(d) 3,3-dichloro-1-(4-butylmercapto-phenyl)-2-pyrrolidinone
(e) 3,3-dichloro-1-(2,4,5-trichlorophenyl)-2-pyrrolidinone
(f) 3,3-dichloro-1-(2-bromo-6-chloro-4-nitrophenyl)-2-pyrrolidinone
(g) 3,3-dichloro-1-[4-(5-phenylpentyloxy)phenyl]-2-pyrrolidinone
(h) 3,3-dichloro-1-(4-phenethyloxyphenyl)-2-pyrrolidinone
(i) 3,3-dichloro-1-(2-bromo-4-isopentylphenyl)-2-pyrrolidinone
(j) 3,3-dichloro-1-(2,5-dimethyl-4-nitrophenyl)-2-pyrrolidinone
(k) 3,3-dichloro-1-(2-butoxyphenyl)-2-pyrrolidinone (l) 3,3-dichloro-1-(2,6-dichloro-4-ethylmercaptophenyl)-2-pyrrolidinone
(m) 3,3-dichloro-1-[4-(tert-butyl)sulfonylphenyl)]-2-pyrrolidinone
(n) 3,3-dichloro-1-{4-[3-(4-nitrophenyl)propyl]phenyl}-2-pyrrolidinone
(o) 3,3-dichloro-1-(4-dimethylaminophenyl)-2-pyrrolidinone
(p) 3,3-dichloro-1-(4-dibutylaminophenyl)-2-pyrrolidinone
(q) 1-(2-chlorophenyl)-hexahydro-2H-azepin-2-one Following the general procedure described hereinbefore for the chlorination of a 2-oxopolymethylenimine and using the following:

1-(2-chlorophenyl)-hexahydro-2H-azepin-2-one there can be obtained:

3,3-dichloro-1-(2-chlorophenyl)-hexahydro-2H-azepin-2-one

Following a procedure similar to that described in Example 2A and substituting for 2-chloroaniline and sodium hydroxide an equivalent amount of 4-acetoxyaniline and triethylamine respectively and omitting the 75 ml. water, there can be obtained according to this invention N-(4-acetoxyphenyl)-2,2,4-trichlorobutyramide.

Following a procedure similar to that described in Example 2B and substituting for N-(2-chlorophenyl)-2,2,4-trichlorobutyramide an equivalent amount of N-(4-acetoxyphenyl)-2,2,4-trichlorobutyramide and increasing the amount of ethyl alcohol from 150 ml. to 300 ml., there can be obtained 3,3-dichloro-1-(4-acetoxyphenyl)-2-pyrrolidinone.

By treating 3,3-dichloro-1-(4-acetoxyphenyl)-2-pyrrolidinone in aqueous methyl alcohol, at room temperature, with an amount of potassium hydroxide which is in slight excess of that required to hydrolyze the acetoxy group, there can be obtained 3,3-dichloro-1-(4-hydroxyphenyl)-2-pyrrolidinone.

EXAMPLE 3

(A) N-(3)-chlorophenyl)-2,2,4-trichlorobutyramide

Following a procedure similar to that described in Example 2A and using 6.37 g. 3-chloroaniline, 2.1 g. sodium hydroxide, and 10.5 g. 2,2,4-trichlorobutyryl chloride, there was obtained N-(3-chlorophenyl)-2,2,4-trichlorobutyramide as an orange oil which was used as such in the next step.

(B) 3,3-dichloro-1-(3-chlorophenyl)-2-pyrrolidinone

Following a procedure similar to that described in Example 2B and using the N-(3-chlorophenyl)-2,2,4-trichlorobutyramide from Example 3A and 2.1 g. sodium hydroxide, there was obtained after recrystallization from methyl alcohol-water 6.7 g. 3,3-dichloro-1-(3-chlorophenyl)-2-pyrrolidinone; M.P. 76–77.5° C.

EXAMPLE 4

(A) N-(3-fluorophenyl)-2,2,4-trichlorobutyramide

Following a procedure similar to that described in Example 2A and using 5.55 g. 3-fluoroaniline, 2.1 g. sodium hydroxide, and 10.5 g. 2,2,4-trichlorobutyryl chloride, there was obtained N-(3-fluorophenyl)-2,2,4-trichlorobutyramide as an orange oil which was used as such in the next step.

(B) 3,3-dichloro-1-(3-fluorophenyl)-2-pyrrolidinone

Following a procedure similar to that described in Example 2B and using the N-(3-fluorophenyl)-2,2,4-trichlorobutyramide from Example 4A and 2.1 g. sodium hydroxide, there was obtained after recrystallization from benzene-hexane 7.3 g. 3,3-dichloro-1-(3-fluorophenyl)-2-pyrrolidinone; M.P. 88–90° C.

EXAMPLE 5

(A) N-(4-fluorophenyl)-2,2,4-trichlorobutyramide

Following a procedure similar to that described in Example 2A and using 5.55 g. 4-fluoroaniline, 2.1 g. sodium hydroxide, and 10.5 g. 2,2,4-trichlorobutyryl chloride there was obtained N-(4-fluorophenyl)-2,2,4-trichlorobutyramide as brown crystals which was used as such in the next step.

(B) 3,3-dichloro-1-(4-fluorophenyl)-2-pyrrolidinone

Following a procedure similar to that described in Example 2B and using the N-(4-fluorophenyl)-2,2,4-trichlorobutyramide from Example 5A and 2.1 g. sodium hydroxide, there was obtained after recrystallization from methyl alcohol-water 5.8 g. 3,3-dichloro-1-(4-fluorophenyl)-2-pyrrolidinone; M.P. 106–107° C.

EXAMPLE 6

(A) N-(4-bromophenyl)-2,2,4-trichlorobutyramide

Following a procedure similar to that described in Example 2A and using 8.6 g. 4-bromoaniline, 2.1 g. sodium hydroxide, and 10.5 g. 2,2,4-trichlorobutyryl chloride, there was obtained N-(4-bromophenyl)-2,2,4-trichlorobutyramide as a yellow oil which was used as such in the next step.

(B) 3,3-dichloro-1-(4-bromophenyl)-2-pyrrolidinone

Following a procedure similar to that described in Example 2B and using the N-(4-bromophenyl)-2,2,4-trichlorobutyramide from Example 6A and 2.1 g. sodium hydroxide, there was obtained after recrystallization from benzene-hexane 9.8 g. 3,3-dichloro-1-(4-bromophenyl)-2-pyrrolidinone; M.P. 122–124° C.

EXAMPLE 7

(A) N-phenyl-2,2,4-trichlorobutyramide

Following a procedure similar to that described in Example 2A and using 4.65 g. aniline, 2.1 g. sodium hydroxide, and 10.5 g. 2,2,4-trichlorobutyryl chloride, there was obtained N-phenyl-2,2,4-trichlorobutyramide as a yellow solid which was used as such in the next step.

(B) 3,3-dichloro-1-phenyl-2-pyrrolidinone

Following a procedure similar to that described in Example 2B and using the N-phenyl-2,2,4-trichlorobutyramide from Example 7A and 2.1 g. sodium hydroxide, there was obtained after recrystallization from methyl alcohol-water 6.3 g. of 3,3-dichloro-1-phenyl-2-pyrrolidinone; M.P. 85–87° C.

EXAMPLE 8

(A) N-(4-tolyl)-2,2,4-trichlorobutyramide

Following a procedure similar to that described in Example 2A and using 5.35 g. p-toluidine, 2.1 g. sodium hydroxide, and 10.5 g. 2,2,4-trichlorobutyryl chloride, there was obtained N-(4-tolyl)-2,2,4-trichlorobutyramide as an oil which was used as such in the next step.

(B) 3,3-dichloro-1-(4-tolyl)-2-pyrrolidinone

Following a procedure similar to that described in Example 2B and using the N-(4-tolyl)-2,2,4-trichlorobutyramide from Example 8A and 2.1 g. sodium hydroxide, there was obtained after recrystallization from benzene-hexane 7.6 g. 3,3-dichloro-1-(4-tolyl)-2-pyrrolidinone; M.P. 118–119.5° C.

EXAMPLE 9

(A) N-(4-methoxyphenyl)-2,2,4-trichlorobutyramide

Following a procedure similar to that described in Example 2A and using 6.15 g. p-anisidine, 2.1 g. sodium hydroxide and 10.5 g. 2,2,4-trichlorobutyryl chloride, there was obtained N-(4-methoxyphenyl)-2,2,4-trichlorobutyramide as brown crystals which was used as such in the next step.

(B) 3,3-dichloro-1-(4-methoxyphenyl)-2-pyrrolidinone

Following a procedure similar to that described in Example 2B and using the N-(4-methoxyphenyl)-2,2,4-trichlorobutyramide from Example 9A and 2.1 g. sodium hydroxide, there was obtained after recrystallization from ethyl acetate 5.9 g. 3,3-dichloro-1-(4-methoxyphenyl)-2-pyrrolidinone; M.P. 121–121.5° C.

EXAMPLE 10

(A) N-(3,4-dimethoxyphenyl)-2,2,4-trichlorobutyramide

Following a procedure similar to that described in Example 2A and using 7.2 g. 3,4-dimethoxyaniline, 2.0 g. sodium hydroxide, and 9.9 g. 2,2,4-trichlorobutyryl chloride, therew as obtained N-(3,4-dimethoxyphenyl)-2,2,4-trichlorobutyramide which was used without further purification in the next step.

(B) 3,3-dichloro-1-(3,4-dimethoxyphenyl)-2-pyrrolidinone

Following a procedure similar to that described in Example 2B and using the N-(3,4-dimethoxyphenyl)-2,2,4-trichlorobutyramide from Example 10A and 2.0 g. sodium hydroxide, there was obtained after recrystallization from acetone 6.9 g. 3,3-dichloro-1-(3,4-dimethoxyphenyl)-2-pyrrolidinone; M.P. 183–185° C.

EXAMPLE 11

(A) N-(3-chloro-6-methoxyphenyl-2,2,4-trichlorobutyramide

Following a procedure similar to that described in Example 2A and using 7.87 g. 3-chloro-6-methoxyaniline, 2.1 g. sodium hydroxide, and 10.5 g. 2,2,4-trichlorobutyryl chloride, there was obtained N-(3-chloro-6-methoxyphenyl)-2,2,4-trichlorobutyramide as a brown oil which which was used as such in the next step.

(B) 3,3-dichloro-1-(3-chloro-6-methoxyphenyl)-2-pyrrolidinone

Following a procedure similar to that described in Example 2B and using the N-(3-chloro-6-methoxyphenyl)-2,2,4-trichlorobutyramide from Example 11A and 2.1 g. sodium hydroxide, there was obtained after recrystallization from methyl alcohol-water 9.7 g. 3,3-dichloro-1-(3-chloro-6-methoxyphenyl)-2-pyrrolidinone; M.P. 118–120° C.

EXAMPLE 12

(A) N-(4-benzyloxyphenyl)-2,2,4-trichlorobutyramide

Following a procedure similar to that described in Example 2A and using 10 g. 4-benzyloxyaniline, 2.1 g. sodium hydroxide, and 10.5 g. 2,2,4-trichlorobutyryl chloride, there was obtained N-(4-benzyloxyphenyl)-2,2,4-trichlorobutyramide as a solid which was used as such in the next step.

(B) 3,3-dichloro-1-(4-benzyloxyphenyl)-2-pyrrolidinone

Following a procedure similar to that described in Example 2B and using the N-(4-benzyloxyphenyl)-2,2,4-trichlorobutyramide from Example 12A and 2.1 g. sodium hydroxide, there was obtained after recrystallization from benzene-hexane 9.5 g. 3,3-dichloro-1-(4-benzyloxyphenyl)-2-pyrrolidinone; M.P. 163.5–165° C.

EXAMPLE 13

(A) N-(4-acetamidophenyl)-2,2,4-trichlorobutyramide

Following a procedure similar to that described in Example 2A and using 4.5 g. 4-acetamidoaniline, 1.3 g. sodium hydroxide, and 6.3 g. 2,2,4-trichlorobutyryl chloride, there was obtained N-(4-acetamidophenyl)-2,2,4-trichlorobutyramide as a solid which was used as such in the next step.

(B) 3,3-dichloro-1-(4-acetamidophenyl)-2-pyrrolidinone

Following a procedure similar to that described in Example 2B and using the N-(4-acetamidophenyl)-2,2,4-trichlorobutyramide from Example 13A and 1.3 g. sodium hydroxide, there was obtained after recrystallization from methyl alcohol 4.1 g. 3,3-dichloro-1-(4-acetamidophenyl)-2-pyrrolidinone; M.P. 195–196° C. (dec.).

By treating 3,3-dichloro-1-(4-acetamidophenyl)-2-pyrrolidinone in absolute ethyl alcohol, at room temperature, with an ethereal solution containing an amount of hydrogen chloride slightly in excess of that required to hydrolyze the acetamido group, there can be obtained the hydrochloride salt of 3,3-dichloro-1-(4-aminophenyl)-2-pyrrolidinone which can be converted to the free base by dissolving the salt in ethyl alcohol and treating the resulting solution with an equivalent amount of sodium carbonate in water.

EXAMPLE 14

(A) N-(4-nitrophenyl)-2,2,4-trichlorobutyramide

Following a procedure similar to that described in Example 2A and using 6.9 g. 4-nitroaniline, 4.4 g. sodium bicarbonate, and 10.5 g. 2,2,4-trichlorobutyryl chloride, there was obtained N-(4-nitrophenyl)-2,2,4-trichlorobutyramide as yellow crystals which were used as such in the next step.

(B) 3,3-dichloro-1-(4-nitrophenyl)-2-pyrrolidinone

Following a procedure similar to that described in Example 2B and using the N-(4-nitrophenyl)-2,2,4-trichlorobutyramide from Example 14A and 2.1 g. sodium hydroxide, there was obtained after recrystallization from acetone-water 6.0 g. 3,3-dichloro-1-(4-nitrophenyl)-2-pyrrolidinone; M.P. 162–163° C.

EXAMPLE 15

(A) N-[4-(trifluoromethyl)phenyl]-2,2,4-trichlorobutyramide

Following a procedure similar to that described in Example 2A and using 8.05 g. 4-(trifluoromethyl)aniline, 4.4 g. sodium bicarbonate, and 10.5 g. 2,2,4-trichlorobutyryl chloride, there was obtained N-[4-(trifluoromethyl)phenyl]-2,2,4-trichlorobutyramide as yellow crystals which was used as such in the next step.

(B) 3,3-dichloro-1-[4-(trifluoromethyl)phenyl]-2-pyrrolidinone

Following a procedure similar to that described in Example 2B and using the N-[4-(trifluoromethyl)phenyl]-2,2,4-trichlorobutyramide from Example 15A and 2.1 g. sodium hydroxide there was obtained after recrystallization from methyl alcohol 6.4 g. 3,3-dichloro-1-[4-trifluoromethyl)phenyl]-2-pyrrolidinone; M.P. 106–107° C.

EXAMPLE 16

(A) N-[2-(trifluoromethyl)phenyl]-2,2,4-trichlorobutyramide

Following a procedure similar to that described in Example 2A and using 8.05 g. (2-trifluoromethyl)aniline, 2.1 g. sodium hydroxide, and 10.5 g. 2,2,4-trichlorobutyryl chloride, there was obtained N-[2-(trifluoromethyl)phenyl]-2,2,4-trichlorobutyramide as a yellow oil which was used as such in the next step.

(B) 3,3-dichloro-1-[2-trifluoromethyl)phenyl]-2-pyrrolidinone

A procedure was followed similar to that described in Example 2B, using the N-[2-(trifluoromethyl)phenyl]-2,2,4-trichlorobutyramide from Example 16A and 2.1 g. sodium hydroxide, except that the reaction solution was diluted with water and extracted with benzene. Evaporation of the benzene extract to dryness yielded, after recrystallization from hexane, 4.0 g. 3,3-dichloro-1-[trifluoromethyl)phenyl]-2-pyrrolidinone; M.P. 64.5° C.

EXAMPLE 17

(A) N-(2-naphthyl)-2,2,4-trichlorobutyramide

To a stirred ice-cooled mixture of 7.16 g. 2-naphthylamine in 150 ml. benzene and 5.63 g. sodium carbonate in water was added 10.5 g. 2,2,4-trichlorobutyryl chloride in 50 ml. benzene during one-half hour and stirring was continued one-half hour with cooling and one and one-half hours at room temperature. The benzene phase was separated, washed with dilute aqueous hydrochloric acid solution, water, dilute sodium bicarbonate solution and water, dried over calcium sulfate and evaporated to dryness to yield 15.9 g. (N-(2-naphthyl)-2,2,4-trichlorobutyramide as a solid which was used as such in the next step.

(B) 3,3-dichloro-1-(2-naphthyl)-2-pyrrolidinone

To the N-(2-naphthyl)-2,2,4-trichlorobutyramide from Example 17A in 100 ml. ethyl alcohol was added, with stirring, a solution of 1.0 g. sodium hydroxide in 10 ml. water and when the pH of the reaction mixture returned to approximately seven an additional solution of 1.0 g. of sodium hydroxide in 10 ml. water was added. When the pH of the reaction mixture returned to approximately seven, it was adjusted to pH thirteen by the addition of 50% aqueous sodium hydroxide solution and stirring was continued for one hour. The reaction mixture was diluted with water and the resulting precipitate was collected by filtration and recrystallized from methyl alcohol to yield 11.0 g. 3,3-dichloro-1-(2-naphthyl)-2-pyrrolidinone; M.P. 163.5–164.5° C.

EXAMPLE 18

(A) N-(4-chloro-1-naphthyl)-2,2,4-trichlorobutyramide

Following a procedure similar to that described in Example 17A and using 8.88 g. 4-chloro-1-aminonaphthalene, 5.62 g. sodium carbonate and 10.5 g. 2,2,4-trichlorobutyryl chloride, there was obtained 16.6 g. N-(4-chloro-1-naphthyl)-2,2,4-trichlorobutyramide which was used as such in the next step.

(B) 3,3-dichloro-1-(4-chloro-1-naphthyl)-2-pyrrolidinone

Following a procedure similar to that described in Example 17B and using 16.6 g. N-(4-chloro-1-naphthyl)-2,2,4-trichlorobutyramide from Example 18A and 1.48 g. sodium hydroxide, there was obtained after recrystallization from methyl alcohol 11.9 g. 3,3-dichloro-1-(4-chloro-1-naphthyl)-2-pyrrolidinone; M.P. 211.9–220° C.

EXAMPLE 19

(A) N-(1-naphthyl)-2,2,4-trichlorobutyramide

Following a procedure similar to that described in Example 17A and using 7.15 g. 1-naphthylamine, 2.1 g. sodium hydroxide, and 10.5 g. 2,2,4-trichlorobutyryl chloride, there was obtained N-(1-naphthyl)-2,2,4-trichlorobutyramide as a brown gum which was used as such in the next step.

(B) 3,3-dichloro-1-(1-naphthyl)-2-pyrrolidinone

Following a procedure similar to that described in Example 17B and using the N-(1-naphthyl)-2,2,4-trichlorobutyramide from Example 19A and 2.1 g. sodium hydroxide, there was obtained after recrystallization from methyl alcohol 9.05 g. 3,3-dichloro-1-(1-naphthyl)-2-pyrrolidinone; M.P. 150–151° C.

Following a procedure similar to that described in Example 17A and substituting for 2-naphthylamine an equivalent amount of:

(a) 1-amino-2-bromo-4,7-dinitronaphthalene
(b) 1-amino-2-methoxy-6-methylsulfonylnaphthalene
(c) 1-amino-2-phenethyloxynaphthalene
(d) 1-amino-2-phenoxynaphthalene
(e) 2-amino-1-methylmercaptonaphthalene
(f) 1-amino-5-hexyloxynaphthalene
(g) 1-amino-3-benzylnaphthalene
(h) 1-amino-2-(trifluoromethyl)naphthalene
(i) 1-amino-2,4-dimethylnaphthalene
(j) 1-amino-8-bromonaphthalene
(k) 2-amino-6-tert-butylnaphthalene
(l) 2-amino-3-bromo-5,6,7,8-tetrahydronaphthalene
(m) 1-amino-4-dimethylaminonaphthalene
(n) 2-acetamido-6-aminonaphthalene there can be obtained respectively, according to this invention:

(a) N-(2-bromo-4,7-dinitro-1-naphthyl)-2,2,4-trichlorobutyramide
(b) N-(2-methoxy-6-methylsulfonyl-1-naphthyl)-2,2,4-trichlorobutyramide
(c) N-(2-phenethyloxy-1-naphthyl)-2,2,4-trichlorobutyramide
(d) N-(2-phenoxy-1-naphthyl)-2,2,4-trichlorobutyramide
(e) N-(1-methylmercapto-2-naphthyl)-2,2,4-trichlorobutyramide
(f) N-(5-hexyloxy-1-naphthyl)-2,2,4-trichlorobutyramide
(g) N-(3-benzyl-1-naphthyl)-2,2,4-trichlorobutyramide
(h) N-[2-trifluoromethyl)-1-naphthyl]-2,2,4-trichlorobutyramide
(i) N-(2,4-dimethyl-1-naphthyl)-2,2,4-trichlorobutyramide
(j) N-(8-bromo-1-naphthyl)-2,2,4-trichlorobutyramide
(k) N-(6-tert-butyl-2-naphthyl)-2,2,4-trichlorobutyramide
(l) N-(3-bromo-5,6,7,8-tetrahydro-2-naphthyl)-2,2,4-trichlorobutyramide
(m) N-(4-dimethylamino-1-naphthyl)-2,2,4-trichlorobutyramide
(n) N-(2-acetamido-6-naphthyl)-2,2,4-trichlorobutyramide Following a procedure similar to that described in Example 17B and substituting for N-(2-naphthyl)-2,2,4-trichlorobutyramide an equivalent amount of:

(a) N-(2-bromo-4,7-dinitro-1-naphthyl)-2,2,4-trichlorobutyramide
(b) N-(2-methoxy-6-methylsulfonyl-1-naphthyl)-2,2,4-trichlorobutyramide
(c) N-(2-phenethyloxy-1-naphthyl)-2,2,4-trichlorobutyramide
(d) N-(2-phenoxy-1-naphthyl)-2,2,4-trichlorobutyramide
(e) N-(1-methylmercapto-2-naphthyl)-2,2,4-trichlorobutyramide
(f) N-(5-hexyloxy-1-naphthyl)-2,2,4-trichlorobutyramide
(g) N-(3-benzyl-1-naphthyl)-2,2,4-trichlorobutyramide
(h) N-[2-(trifluoromethyl)-1-naphthyl]-2,2,4-trichlorobutyramide
(i) N-(2,4-dimethyl-1-naphthyl)-2,2,4-trichlorobutyramide
(j) N-(8-bromo-1-naphthyl)-2,2,4-trichlorobutyramide
(k) N-(6-tert-btuyl-2-naphthyl)-2,2,4-trichlorobutyramide
(l) N-(3-bromo-5,6,7,8-tetrahydro-2-naphthyl)-2,2,4-trichlorobutyramide
(m) N-(4-dimethylamino-1-naphthyl)-2,2,4-trichlorobutyramide
(n) N-(2-acetamido-6-naphthyl)-2,2,4-trichlorobutyramide there can be obtained respectively, according to this invention:

(a) 3,3-dichloro-1-(2-bromo-4,7-dinitro-1-naphthyl)-2-pyrrolidinone (b) 3,3-dichloro-1-(2-methoxy-6-methylsulfonyl-1-naphthyl)-2-pyrrolidinone
(c) 3,3-dichloro-1(2-phenethyloxy-1-naphthyl)-2-pyrrolidinone
(d) 3,3-dichloro-1-(2-phenoxy-1-naphthyl)-2-pyrrolidinone
(e) 3,3-dichloro-1-(1-methylmercapto-2-naphthyl)-2-pyrrolidinone
(f) 3,3-dichloro-1-(5-hexyloxy-1-naphthyl)-2-pyrrolidinone
(g) 3,3-dichloro-1-(3-benzyl-1-naphthyl)-2-pyrrolidinone
(h) 3,3-dichloro-1-[2-trifluoromethyl)-1-naphthyl]-2-pyrrolidinone
(i) 3,3-dichloro-1-(2,4-dimethyl-1-naphthyl)-2-pyrrolidinone
(j) 3,3-dichloro-1-(8-bromo-1-naphthyl)-2-pyrrolidinone
(k) 3,3-dichloro-1-(6-tert-butyl-2-naphthyl)-2-pyrrolidinone
(l) 3,3-dichloro-1-(3-bromo-5,6,7,8-tetrahydro-2-naphthyl)-2-pyrrolidinone
(m) 3,3-dichloro-1-(4-dimethylamino-1-naphthyl)-2-pyrrolidinone
(n) 3,3-dichloro-1-(2-acetamido-6-naphthyl)-2-pyrrolidinone

EXAMPLE 20

(A) N-(2,6-xylyl)-2,2,4-trichlorobutyramide

To a stirred ice-cooled mixture of 6.06 g. 2,6-dimethylaniline in 100 ml. benzene and 5.62 g. sodium carbonate in 50 ml. water was added 10.5 g. 2,2,4-trichlorobutyryl chloride in 50 ml. benzene during one-half hour and stirring was continued one-half hour with cooling and one and one-half hours at room temperature. The benzene phase was separated, washed with dilute aqueous hydrochloric acid solution, water, dilute sodium bicarbonate solution and water, dried over calcium sulfate and evaporated to dryness to yield after recrystallization from hexane 12.8 g. N-(2,6-xylyl)-2,2,4-trichlorobutyramide; M.P. 119.0–120.0° C.

(B) 3,3-dichloro-1-(2,6-xylyl)-2-pyrrolidinone

To 12.8 g. N-(2,6-xylyl)-2,2,4-trichlorobutyramide from Example 20A in 100 ml. ethyl alcohol was added, with stirring, a solution of 0.8 g. sodium hydroxide in 10 ml. water and when the pH of the reaction mixture returned to approximately seven an additional 0.8 g. sodium hydroxide in 10 ml. water was added. When the pH of the reaction mixture returned to approximately seven, it was adjusted to pH thirteen by the addition of 50% aqueous sodium hydroxide solution and stirring was continued for one hour. The reaction mixture was diluted with water and the resulting precipitate was collected by filtration and recrystallized from methyl alcohol-water to yield 8.7 g. 3,3-dichloro-1-(2,6-xylyl)-2-pyrrolidinone; M.P. 96.5–98.0° C.

EXAMPLE 21

(A) N-(2,4-difluorophenyl)-2,2,4-trichlorobutyramide

Following a procedure similar to that described in Example 20A and using 6.46 g. 2,4-difluoroaniline, 5.62 g. sodium carbonate, and 10.5 g. 2,2,4-trichlorobutyryl chloride, there was obtained 13.6 g. N-(2,4-difluorophenyl)-2,2,4-trichlorobutyramide as an oil which was used as such in the next step.

(B) 3,3-dichloro-1-(2,4-difluorophenyl)-2-pyrrolidinone

Following a procedure similar to that described in Example 20B and using 13.6 g. N-(2,4-difluorophenyl)-2,2,4-trichlorobutyramide from Example 21A and 1.80 g. sodium hydroxide, there was obtained after recrystallization from methyl acetate-hexane 6.43 g. 3,3-dichloro-1-(2,4-difluorophenyl)-2-pyrrolidinone; M.P. 86–87° C.

EXAMPLE 22

(A) N-[3-(phenoxy)phenyl]-2,2,4-trichlorobutyramide

Following a procedure similar to that described in Example 20A and using 9.26 g. 3-phenoxyaniline, 5.62 g. sodium carbonate, and 10.5 g. 2,2,4-trichlorobutyryl chloride, there was obtained 16.4 g. N-[3-(phenoxy)phenyl]-2,2,4-trichlorobutyramide as an oil which was used as such in the next step.

(B) 3,3-dichloro-1-[3-(phenoxy)phenyl]-2-pyrrolidinone

Following a procedure similar to that described in Example 20B and using 16.4 g. N-[3-(phenoxy)phenyl]-2,2,4-trichlorobutyramide from Example 22A and 3.83 g. sodium hydroxide, there was obtained after recrystallization from methyl alcohol-water 12.2 g. 3,3-dichloro-1-[3-(phenoxy)phenyl]-2-pyrrolidinone; M.P. 89.5–90.5° C.

EXAMPLE 23

(A) N-[4-chloro-2-(trifluoromethyl)phenyl]-2,2,4-trichlorobutyramide

Following a procedure similar to that described in Example 20A and using 9.78 g. 4-chloro-2-(trifluoromethyl)-aniline, 5.62 g. sodium carbonate, and 10.5 g. 2,2,4-trichlorobutyrylchloride, there was obtained N-[4-chloro-2-(trifluoromethyl)phenyl] - 2,2,4 - trichlorobutyramide as crystals which were used as such in the next step.

(B) 3,3-dichloro-1-[4-chloro-2-(trifluoromethyl)phenyl]-2-pyrrolidinone

Following a procedure similar to that described in Example 20B and using the N-[4-chloro-2-(trifluoromethyl)-phenyl]-2,2,4-trichlorobutyramide from Example 23a and 2.0 g. sodium hydroxide, there was obtained after recrystallization from hexane 7.97 g. 3,3-dichloro-1-[4-chloro-2-(trifluoromethyl)phenyl]-2-pyrrolidinone; M.P. 78–80° C.

EXAMPLE 24

(A) N-[3,5-bis(trifluoromethyl)phenyl]-2,2,4-trichlorobutyramide

Following a procedure similar to that described in Example 20A and using 11.5 g. 3,5-bis(trifluoromethyl)aniline, 5.62 g. sodium carbonate, and 10.5 g. 2,2,4-trichlorobutyryl chloride, there was obtained 19.9 g. N-[3,5-bis(trifluoromethyl)phenyl]-2,2,4-trichlorobutyramide as a solid which was used as such in the next step.

(B) 3,3-dichloro-1-[3,5-bis(trifluoromethyl)phenyl]-2-pyrrolidinone

Following a procedure similar to that described in Example 20B and using the N-[3,5-bis(trifluoromethyl)phenyl]-2,2,4-trichlorobutyramide from Example 24A and 1.98 g. sodium hydroxide, there was obtained after recrystallization from methyl alcohol-water 8.19 g. 3,3-dichloro-1-[3,5 - bis(trifluoromethyl)phenyl] - 2-pyrrolidinone; M.P. 88–90° C.

EXAMPLE 25

(A) N-(2,6-dimethyl-3-pyridyl)-2,2,4-trichlorobutyramide

To a stirred, ice-cooled mixture of 6.1 g. 3-amino-2,6-dimethylpyridine in 125 ml. ethylene dichloride and 4.2 g. sodium bicarbonate in 50 ml. water was added 10.5 g. 2,2,4-trichlorobutyrylchloride in 25 ml. ethylene dichloride during one-half hour and stirring was continued one-half hour. The ethylene dichloride phase was washed with dilute aqueous sodium bicarbonate solution and water and the ethylene dichloride layer was then extracted with one normal aqueous hydrochloric acid solution and water. The aqueous acidic solution was treated with aqueous sodium bicarbonate solution until neutral and the resulting oily precipitate was taken up in ether and the ethereal solution was dried over calcium sulfate and evaporated to dryness. The resulting oil, dissolved in acetone, was treated with one equivalent of hydrogen chloride in ethyl alcohol to yield after recrystallization from ethyl alcohol-acetone 8.1 g. of the hydrochloride of N-(2,6-dimethyl-3-pyridyl)-2,2,4-trichlorobutyramide; M.P. 180–181° C. (dec.).

(B) 3,3-dichloro-1-(2,6-dimethyl-3-pyridyl)-2-pyrrolidinone

To a stirred solution of 5 g. of the hydrochloride of N-(2,6-dimethyl - 3 - pyridyl) - 2,2,4 - trichlorobutyramide from Example 25A in 30 ml. ethyl alcohol was added a solution of 1.2 g. sodium hydroxide in 12 ml. water in small portions during twenty minutes and stirring was continued for one-half hour. The reaction solution was diluted with water and the resulting precipitate was collected by filtration and recrystallized from methyl-alcohol-water to yield 1.12 g. 3,3-dichloro-1-(2,6-dimethyl-3-pyridyl)-2-pyrrolidinone; M.P. 87.8–89.8° C. (corr.).

EXAMPLE 26

(A) N-(2-chloro-3-pyridyl)-2,2,4-trichlorobutyramide

A procedure was followed similar to that described in Example 25A using benzene instead of ethylene dichloride, 6.43 g. 3-amino-2-chloropyridine, 5.62 g. sodium carbonate, and 10.5 g. 2,2,4-trichlorobutyryl chloride, except that the benzene phase was washed only with water and then evaporated to dryness to yield 14.8 g. N-(2-chloro-3-pyridyl)-2,2,4-trichlorobutyramide as crystals which were used as such in the next step.

(B) 3,3-dichloro-1-(2-chloro-3-pyridyl)-2-pyrrolidinone

Following a procedure similar to that described in Example 25B and using 14.8 g. N-(2-chloro-3-pyridyl)-2,2,4-trichlorobutyramide from Example 26A and 1.96 g. sodium hydroxide, there was obtained after recrystallization from methyl alcohol 8.1 g. 3,3-dichloro-1-(2-chloro-3-pyridyl)-2-pyrrolidinone; M.P. 128–130° C.

Following a procedure similar to that described in Example 25A and substituting for 3-amino-2,6-dimethylpyridine an equivalent amount of:

(a) 2-aminopyridine
(b) 3-aminopyridine
(c) 4-aminopyridine
(d) 5-amino-2-dimethylaminopyridine
(e) 2-amino-6-hexylpyridine
(f) 3-amino-6-ethoxy-2-methylmercaptopyridine
(g) 3-amino-4-phenethylpyridine
(h) 5-amino-2-benzyloxypyridine
(i) 4-amino-2,4-dichloro-6-(trichloromethyl)pyridine
(j) 5-amino-2-n-butylmercapto-3-nitropyridine
(k) 3-amino-5-chloro-2-phenoxypyridine
(l) 2-amino-5-tert-butylpyridine
(m) 2-amino-3,5,6-trifluoropyridine
(n) 5-amino-2-(n-butylsulfonyl)pyridine
(o) 2-acetamido-6-aminopyridine there can be obtained respectively, according to this invention:

(a) N-(2-pyridyl)-2,2,4-trichlorobutyramide
(b) N-(3-pyridyl)-2,2,4-trichlorobutyramide
(c) N-(4-pyridyl)-2,2,4-trichlorobutyramide
(d) N-(2-dimethylamino-5-pyridyl)-2,2,4-trichlorobutyramide
(e) N-(6-hexyl-2-pyridyl)-2,2,4-trichlorobutyramide
(f) N-(6-ethoxy-2-methylmercapto-3-pyridyl)-2,2,4-trichlorobutyramide
(g) N-(4-phenethyl-3-pyridyl)-2,2,4-trichlorobutyramide
(h) N-(2-benzyloxy-5-pyridyl)-2,2,4-trichlorobutyramide
(i) N-[2,3-dichloro-6-(trichloromethyl)-4-pyridyl]-2,2,4-trichlorobutyramide
(j) N-(2-n-butylmercapto-3-nitro-5-pyridyl)-2,2,4-trichlorobutyramide
(k) N-(5-chloro-2-phenoxy-3-pyridyl)-2,2,4-trichlorobutyramide
(l) N-(5-tert-butyl-2-pyridyl)-2,2,4-trichlorobutyramide
(m) N-(3,5,6-trifluoro-2-pyridyl)-2,2,4-trichlorobutyramide
(n) N-(2-n-butylsulfonyl-5-pyridyl)-2,2,4-trichlorobutyramide
(o) N-(2-acetamido-6-pyridyl)-2,2,4-trichlorobutyramide Following a procedure similar to that described in Example 25B and substituting for N-(2,6-dimethyl-3-pyridyl)-2,2,4-trichlorobutyramide an equivalent amount of:

(a) N-(2-pyridyl)-2,2,4-trichlorobutyramide
(b) N-(3-pyridyl)-2,2,4-trichlorobutyramide
(c) N-(4-pyridyl)-2,2,4-trichlorobutyramide
(d) N-(2-dimethylamino-5-pyridyl)-2,2,4-trichlorobutyramide
(e) N-(6-hexyl-2-pyridyl)-2,2,4-trichlorobutyramide
(f) N-(6-ethoxy-2-methylmercapto-3-pyridyl)-2,2,4-trichlorobutyramide
(g) N-(4-phenethyl-3-pyridyl)-2,2,4-trichlorobutyramide
(h) N-(2-benzyloxy-5-pyridyl)-2,2,4-trichlorobutyramide
(i) N-[2,3-dichloro-6-(trichloromethyl)-4-pyridyl]-2,2,4-trichlorobutyramide
(j) N-(2-n-butylmercapto-3-nitro-5-pyridyl)-2,2,4-trichlorobutyramide
(k) N-(5-chloro-2-phenoxy-3-pyridyl)-2,2,4-trichlorobutyramide
(l) N-(5-tert-butyl-2-pyridyl)-2,2,4-trichlorobutyramide
(m) N-(3,5,6-trifluoro-2-pyridyl)-2,2,4-trichlorobutyramide
(n) N-(2-n-butylsulfonyl-5-pyridyl)-2,2,4-trichlorobutyramide
(o) N-(2-acetamido-6-pyridyl)-2,2,4-(trichlorobutyramide there can be obtained respectively, according to this invention:

(a) 3,3-dichloro-1-(2-pyridyl)-2-pyrrolidinone
(b) 3,3-dichloro-1-(3-pyridyl)-2-pyrrolidinone
(c) 3,3-dichloro-1-(4-pyridyl)-2-pyrrolidinone
(d) 3,3-dichloro-1-(2-dimethylamino-5-pyridyl)-2-pyrrolidinone
(e) 3,3-dichloro-1-(6-hexyl-2-pyridyl)-2-pyrrolidinone
(f) 3,3-dichloro-1-(6-ethoxy-2-methylmercapto-3-pyridyl)-2-pyrrolidinone
(g) 3,3-dichloro-1-(4-phenethyl-3-pyridyl)-2-pyrrolidinone
(h) 3,3-dichloro-1-(2-benzyloxy-5-pyridyl)-2-pyrrolidinone
(i) 3,3-dichloro-1-[2,3-dichloro-6-(trichloromethyl)-4-pyridyl]-2-pyrrolidinone
(j) 3,3-dichloro-1-(2-n-butylmercapto-3-nitro-5-pyridyl)-2-pyrrolidinone
(k) 3,3-dichloro-1-(5-chloro-2-phenoxy-3-pyridyl)-2-pyrrolidinone
(l) 3,3-dichloro-1-(5-tert-butyl-2-pyridyl)-2-pyrrolidinone
(m) 3,3-dichloro-1-(3,5,6-trifluoro-2-pyridyl)-2-pyrrolidinone
(n) 3,3-dichloro-1-(2-n-butylsulfonyl-5-pyridyl)-2-pyrrolidinone
(o) 3,3-dichloro-1-(2-acetamido-6-pyridyl)-2-pyrrolidinone By treating 3,3-dichloro-1-(2-acetamido-6-pyridyl)-2-pyrrolidinone in absolute ethyl alcohol, at room temperature, with an ethereal solution containing an amount of hydrogen chloride slightly in excess of that required to hydrolyze the acetamido group, there can be obtained the dihydrochloride salt of 3,3 - dichloro-1-(2-amino-6-pyridyl)-2-pyrrolidinone which can be converted to the free base by dissolving the salt in ethyl alcohol and treating the resulting solution with an equivalent of sodium carbonate in water.

EXAMPLE 27

(A) N-(5-chloro-2-pyridyl)-2,2,4-trichlorobutyramide

Following a procedure similar to that described for Example 25A and using 11.9 g. 2-amino - 5 - chloropyridine, 6.42 g. sodium carbonate, and 10.5 g. 2,2,4-trichlorobutyryl chloride, there was obtained 11.9 g. N-(5-chloro-2-pyridyl)-2,2,4-trichlorobutyramide as crystals which was used as such in the next step.

(B) 3,3-dichloro-1-(5-chloro-2-pyridyl)-2-pyrrolidinone

Following a procedure similar to that described in Example 25B and using 11.9 g. N-(5-chloro-2-pyridyl)-2,2,4-trichlorobutyramide from Example 27A and 1.58 g. sodium hydroxide, there was obtained after recrystallization from methyl alcohol 3.56 g. 3,3-dichloro-1-(5-chloro-2-pyridyl)-2-pyrrolidinone; M.P. 106–107° C.

EXAMPLE 28

(A) N-(4-chloro-2-benzothiazolyl)-2,2,4-trichlorobutyamide

To a stirred ice-cooled mixture of 9.2 g. 2-amino-4-chlorobenzothiazole in 700 ml. ethylene dichloride and 5.63 g. sodium carbonate in 100 ml. water was added a solution of 10.5 g. 2,2,4-trichlorobutyryl chloride in 50 ml. ethylene dichloride dropwise during twenty minutes. Stirring was continued for two hours at room temperature and the ethylene dichloride phase was separated and washed with water, dried over sodium sulfate and evaporated to dryness to yield, after recrystallization from methyl alcohol-acetone-water, 13.6 g. N-(4-chloro-2-benzothiazolyl)-2,2,4-trichlorobutyramide; M.P. 150–155° C.

(B) 3,3-dichloro-1-(4-chloro-2-benzothiazolyl)-2-pyrrolidinone

To a stirred solution of 13.6 g. N-(4-chloro-2-benzothiazolyl)-2,2,4-trichlorobutyramide from Example 28A in 400 ml. methyl alcohol at room temperature was added a solution of 1.53 g. sodium hydroxide in 10 ml. water dropwise. The pH of the mixture was adjusted to seven by the addition of a few drops 1 N aqueous hydrochloric acid solution and stirring was continued for five minutes. The mixture was diluted with 30 ml. water and the precipitate was collected by filtration and recrystallized from benzene-methyl alcohol to yield 9.36 g. 3,3-dichloro-1-(4-chloro-2-benzothiazolyl)-2-pyrrolidinone; M.P. 208–209° C.

Following a procedure similar to that described in Example 28A and substituting for 2-amino-4-chlorobenzothiazole an equivalent amount of:

(a) 2-aminobenzothiazole
(b) 4-aminobenzothiazole
(c) 5-aminobenzothiazole
(d) 6-aminobenozthiazole
(e) 7-aminobenzothiazole
(f) 2-amino-6-n-butoxybenzothiazole
(g) 2-amino-5,7-dichloro-4-methoxybenzothiazole
(h) 2-amino-6-ethylmercaptobenzothiazole
(i) 6-amino-2-phenoxybenzothiazole
(j) 6-amino-2-dimethylaminobenzothiazole
(k) 2-amino-6-(trifluoromethyl)benzothiazole
(l) 2-amino-4-bromo-6-methylsulfonylbenzothiaozle
(m) 5-amino-2-methyl-4-nitrobenzothiazole
(n) 2-acetamido-6-aminobenzothiazole there can be obtained respectively, according to this invention:

(a) N-(2-benzothiazolyl)-2,2,4-trichlorobutyramide
(b) N-(4-benzothiazolyl)-2,2,4-trichlorobutyramide
(c) N-(5-benzothiazolyl)-2,2,4-trichlorobutyramide
(d) N-(6-benzothiazolyl)-2,2,4-trichlorobutyramide
(e) N-(7-benzothiazolyl)-2,2,4-trichlorobutyramide
(f) N-(6-n-butoxy-2-benzothiazolyl)-2,2,4-trichlorobutyramide
(g) N-(5,7-dichloro-4-methoxy-2-benzothiazolyl)-2,2,4-trichlorobutyramide
(h) N-(6-ethylmercapto-2-benzothiazolyl)-2,2,4-trichlorobutyramide
(i) N-(2-phenoxy-6-benzothiazolyl)-2,2,4-trichlorobutyramide
(j) N-(2-dimethylamino-6-benzothiazolyl)-2,2,2-trichlorobutyramide
(k) N-[6-(trifluoromethyl)-2-benzothiazolyl]-2,2,4-trichlorobutyramide
(l) N-(4-bromo-6-methylsulfonyl-2-benzothiazolyl)-2,2,4-trichlorobutyramide
(m) N-(2-methyl-4-nitro-5-benzothiazolyl)-2,2,4-trichlorobutyramide
(n) N-(2-acetamido-6-benzothiazolyl)-2,2,4-trichlorobutyramide.

Following a procedure similar to that described in Example 28B and substituting for N-(4-chloro-2-benzothiazolyl)-2,2,4-trichlorobutyramide an equivalent amount of:

(a) N-(2-benzothiazolyl)-2,2,4-trichlorobutyramide
(b) N-(4-benzothiazolyl)-2,2,4-trichlorobutyramide
(c) N-(5-benzothiazolyl)-2,2,4-trichlorobutyramide
(d) N-(6-benzothiazolyl)-2,2,4-trichlorobutyramide
(e) N-(7-benzothiazolyl)-2,2,4-trichlorobutyramide
(f) N-(6-n-butoxy-2-benzothiazolyl)-2,2,4-trichlorobutyramide
(g) N-(5,7-dichloro-4-methoxy-2-benzothiazolyl)-2,2,4-trichlorobutyramide
(h) N-(6-ethylmercapto-2-benzothiazolyl)-2,2,4-trichlorobutyramide
(i) N-(2-phenoxy-6-benzothiazolyl)-2,2,4-trichlorobutyramide
(j) N-(2-dimethylamino-6-benzothiazolyl)-2,2,4-trichlorobutyramide
(k) N-[6-(trifluoromethyl)-2-benzothiazolyl]-2,2,4-trichlorobutyramide
(l) N-(4-bromo-6-methylsulfonyl-2-benzothiazolyl)-2,2,4-trichlorobutyramide
(m) N-(2-methyl-4-nitro-5-benzothiazolyl)-2,2,4-trichlorobutyramide
(n) N-(2-acetamido-6-benzothiazolyl)-2,2,4-trichlorobutyramide there can be obtained respectively, according to this invention:

(a) 3,3-dichloro-1-(2-benzothiazolyl)-2-pyrrolidinone
(b) 3,3-dichloro-1-(4-benzothiazolyl)-2-pyrrolidinone
(c) 3,3-dichloro-1-(5-benzothiazolyl)-2-pyrrolidinone
(d) 3,3-dichloro-1-(6-benzothiazolyl)-2-pyrrolidinone
(e) 3,3-dichloro-1-(7-benzothiazolyl)-2-pyrrolidinone
(f) 3,3-dichloro-1-(6-n-butoxy-2-benzothiazolyl)-2-pyrrolidinone
(g) 3,3-dichloro-1-(5,7-dichloro-4-methoxy-2-benzothiazolyl)-2-pyrrolidinone
(h) 3,3-dichloro-1-(6-ethylmercapto-2-benzothiazolyl)-2-pyrrolidinone
(i) 3,3-dichloro-1-(2-phenoxy-6-benzothiazolyl)-2-pyrrolidinone
(j) 3,3-dichloro-1-(2-dimethylamino-6-benzothiazolyl)-2-pyrrolidinone
(k) 3,3-dichloro-1-[6-(trifluoromethyl)-2-benzothiazolyl]-2-pyrrolidinone
(l) 3,3-dichloro-1-(4-bromo-6-methylsulfonyl-2-benzothiazolyl)-2-pyrrolidinone
(m) 3,3-dichloro-1-(2-methyl-4-nitro-5-benzothiazolyl)-2-pyrrolidinone
(n) 3,3-dichloro-1-(2-acetamido-6-benzothiazolyl)-2-pyrrolidinone By treating 3,3-dichloro-1-(2-acetamido-6-benzothiazolyl)-2-pyrrolidinone in absolute ethyl alcohol, at room amount of hydrogen chloride slightly in excess of that required to hydrolyze the acetamido group, there can be obtained the hydrochloride salt of 3,3-dichloro-1-(2-amino-6-benzothiazolyl) - 2 - pyrolidinone which can be converted to the free base by dissolving the salt in ethyl alcohol and treating the resulting solution with an equivalent amount of sodium carbonate in water.

EXAMPLE 29

(A) N-(9-oxo-1-fluorenyl)-2,2,4-trichlorobutylramide

To a stirred mixture of 5.65 g. 1-amino-9-fluorenone in 500 ml. ethylene dichloride and 3.83 g. sodium carbonate in 100 ml. water, at room temperature, was added a solution of 6.12 g. 2,2,4-trichlorobutyryl chloride in 50 ml. ethylene dichloride dropwise during twenty minutes. Stirring was continued for sixteen hours and the ethylene dichloride phase was separated and washed with water, dried over sodium sulfate, and evaporated to dryness to yield 10.5 g. N-(9-oxo-1-fluorenyl)-2,2,4-trichlorobutyramide; M.P. 143–145° C.

(B) 3,3-dichloro-1-(9-oxo-1-fluorenyl)-2-pyrrolidinone

To a stirred solution of 9.5 g. N-(9-oxo-1-fluorenyl)-2,2,4-trichlorobutyramide from Example 29A in 300 ml. methyl alcohol-methylene dichloride (prepared by dissolving the amide in 150 ml. refluxing methylene dichloride, adding 200 ml. methyl alcohol, and concentrating the resulting solution to 300 ml.), at room temperature, was added a solution of 1.0 g. sodium hydroxide in 5 ml. water dropwise during five minutes. The reaction mixture was concentrated by evaporation to remove the methylene dichloride and diluted with water to yield after recrystallization from methylene dichloride-methanol 6.8 g. 3,3-dichloro-1-(9-oxo-1-fluorenyl)-2-pyrrolidinone; M.P. 160–161° C.

Following a procedure similar to that described in Example 29A and substituting for 1-amino-9-fluorenone an equivalent amount of:

(a) 1-aminofluorene
(b) 2-aminofluorene
(c) 3-aminofluorene
(d) 4-aminofluorene
(e) 3-amino-2-dimethylaminofluoren-9-one
(f) 2-amino-1,3-dibromo-7-nitrofluorene
(g) 2-amino-7-methylsulfonylfluorene
(h) 1-amino-2-methoxyfluorene
(i) 7-amino-3-methyl-2-nitrofluoren-9-one
(j) 2-amino-3-bromo-6,7-dichlorofluoren-9-one
(k) 2-amino-7-benzylfluorene
(l) 2-acetamido-3-aminofluorene there can be obtained respectively, according to this invention:

(a) N-(1-fluorenyl)-2,2,4-trichlorobutyramide
(b) N-(2-fluorenyl)-2,2,4-trichlorobutyramide
(c) N-(3-fluorenyl)-2,2,4-trichlorobutyramide
(d) N-(4-fluorenyl)-2,2,4-trichlorobutyramide
(e) N-(2-diethylamino-9-oxo-3-fluorenyl)-2,2,4-trichlorobutyramide
(f) N-(1,3-dibromo-7-nitro-2-fluorenyl)-2,2,4-trichlorobutyramide
(g) N-(7-methylsulfonyl-2-fluorenyl)-2,2,4-trichlorobutyramide
(h) N-(2-methoxy-1-fluorenyl)-2,2,4-trichlorobutyramide
(i) N-(3-methyl-2-nitro-9-oxo-7-fluorenyl)-2,2,4-trichlorobutyramide
(j) N-(3-bromo-6,7-dichloro-9-oxo-2-fluorenyl)-2,2,4-trichlorobutyramide
(k) N-(7-benzyl-2-fluorenyl)-2,2,4-trichlorobutyramide
(l) N-(2-acetamido-3-fluorenyl)-2,2,4-trichlorobutyramide there can be obtained respectively, according to this invention:

(a) 3,3-dichloro-1-(1-fluorenyl)-2-pyrrolidinone
(b) 3,3-dichloro-1-(2-fluorenyl)-2-pyrrolidinone
(c) 3,3-dichloro-1-(3-fluorenyl)-2-pyrrolidinone
(d) 3,3-dichloro-1-(4-fluorenyl)-2-pyrrolidinone
(e) 3,3-dichloro-1-(2-diethylamino-9-oxo-3-fluorenyl)-2-pyrrolidinone
(f) 3,3-dichloro-1-(1,3-dibromo-7-nitro-2-fluorenyl)-2-pyrrolidinone
(g) 3,3-dichloro-1-(7-methylsulfonyl-2-fluorenyl)-2-pyrrolidinone
(h) 3,3-dichloro-1-(2-methoxy-1-fluorenyl)-2-pyrrolidinone
(i) 3,3-dichloro-1-(3-methyl-2-nitro-9-oxo-7-fluorenyl)-2-pyrrolidinone
(j) 3,3-dichloro-1-(3-bromo-6,7-dichloro-9-oxo-2-fluorenyl)-2-pyrrolidinone
(k) 3,3-dichloro-1-(7-benzyl-2-fluorenyl)-2-pyrrolidinone
(l) 3,3-dichloro-1-(2-acetamido-3-fluorenyl)-2-pyrrolidinone

EXAMPLE 30

(A) N-(5,6,7,8-tetrahydro-1-naphthyl)-2,2,4-trichlorobutyramide

To a stirred ice-cooled solution of 7.35 g. 5,6,7,8-tetrahydro-1-naphthylamine in 250 ml. methylene dichloride and 5.6 g. triethylamine was added 11.6 g. 2,2,4-trichlorobutyryl chloride in 40 ml. methylene dichloride dropwise during fifteen minutes. The mixture was diluted with chloroform and washed with dilute aqueous sodium bicarbonate solution and water. The organic phase was separated, dired over sodium sulfate and evaporated to dryness to yield 17.0 g. N-(5,6,7,8-tetrahydro-1-naphthyl)-2,2,4-trichlorobutyramide as a yellow oil which was used as such in the next step.

(B) 3,3-dichloro-1-(5,6,7,8-tetrahydro-1-naphthyl)-2-pyrrolidinone

To a stirred ice-cooled solution of 16.0 g. N-(5,6,7,8-tetrahydro-1-naphthyl)-2,2,4-trichlorobutyramide from Example 30A in 150 ml. methyl alcohol was added a solution of 2 g. sodium hydroxide in 10 ml. water dropwise during five minutes. The reaction mixture was diluted with water and the precipitate was collected by filtration to yield after recrystallization from methylene dichloride-hexane 9.2 g. 3,3-dichloro-1-(5,6,7,8-tetrahydro-1-naphthyl)-2-pyrrolidinone; M.P. 129–131° C.

EXAMPLE 31

(A) N-(3,4-dichlorobenzyl)-2,2,4-trichlorobutyramide

To a stirred ice-cooled mixture of 17.6 g. 3,4-dichlorobenzylamine in 200 ml. ethylene dichloride and 4.2 g. sodium hydroxide in 100 ml. water was added 21 g. 2,2,4-trichlorobutyryl chloride. The mixture was stirred for one-half hour and the precipitate was filtered and washed with water. The ethylene dichloride layer was washed with dilute hydrochloric acid and water, dried over sodium sulfate, and evaporated to dryness to yield N-(3,4-dichlorobenzyl)-2,2,4-trichlorobutyramide as a solid which was combined with the crop obtained by filtration and used as such in the next step.

(B) 3,3-dichloro-1-(3,4-dichlorobenzyl)-2-pyrrolidinone

To a stirred solution of the N-(3,4-dichlorobenzyl)-2,2,4-trichlorobutyramide, from Example 31A, in 200 ml. ethyl alcohol was added a solution of 4.2 sodium hydroxide in 42 ml. water. Stirring was continued for ten minutes and dilute aqueous hydrochloric acid was added until the solution turned acidic, followed by 300 ml. water. The resulting crystals were filtered to give, after recrystallization from chloroformhexane 16.0 g. 3,3-dichloro-1-(3,4-dichlorobenzyl)-2-pyrrolidinone; M.P. 94.0–94.8° C. (corr.).

EXAMPLE 32

(A) N-(4-chlorobenzyl)-2,2,4-trichlorobutyramide

To a stirred ice-cooled mixture of 7.08 g. 4-chlorobenzylamine in 75 ml. ethylene dichloride and 4.4 g. sodium bicarbonate in 50 ml. water, in a nitrogen atmosphere, was added a solution of 2,2,4-trichlorobutyryl chloride in 25 ml. ethylene dichloride dropwise during one-half hour and stirring was continued one-half hour. The ethylene dichloride phase was separated, washed with dilute hydrochloric acid and water, and evaporated to dryness to yield N-(4-chlorobenzyl)-2,2,4-trichlorobutyramide which was used as such in the next step.

(B) 3,3-dichloro-1-(4-chlorobenzyl)-2-pyrrolidinone

To a stirred solution of the N-(4-chlorobenzyl)-2,2,4-trichlorobutyramide from Example 32A in 100 ml. ethyl alcohol, in a nitrogen atmosphere, was added a solution of 2.1 g. sodium hydroxide in water dropwise during one-half hour and stirring was continued one-half hour. The precipitate was filtered to give, after recrystallization from methyl alcohol-water 8.2 g. 3,3-dichloro-1-(4-chlorobenzyl)-2-pyrrolidinone, M.P. 72–74° C.

Following a procedure similar to that described in Example 32A and substituting for 4-chlorobenzylamine an equivalent amount of:

(a) 5-phenylhexylamine
(b) 6-phenylhexylamine
(c) 3-(3,4-dichlorophenyl)propylamine
(d) benzylamine
(e) 4-benzylbenzylamine
(f) 4-benzyloxybenzylamine
(g) 4-n-butoxy-α-methylbenzylamine
(h) 2-chloro-3-methoxy-6-methylbenzylamine
(i) 2-chloro-4-methylsulfonylbenzylamine
(j) 2-chloro-6-nitrobenzylamine
(k) α-methyl-4-phenoxybenzylamine
(l) 3,4,5-trimethoxybenzylamine
(m) 2-methylmercaptobenzylamine
(n) 3-(trifluoromethyl)benzylamine
(o) 4-dimethylaminophenethylamine there can be obtained respectively, according to this invention:

(a) N-(5-phenylhexyl)-2,2,4-trichlorobutyramide
(b) N-(6-phenylhexyl)-2,2,4-trichlorobutyramide
(c) N-[3-(3,4-dichlorophenyl)propyl]-2,2,4-trichlorobutyramide
(d) N-benzyl-2,2,4-trichlorobutyramide
(e) N-(4-benzylbenzyl)-2,2,4-trichlorobutyramide
(f) N-(4-benzyloxybenzyl)-2,2,4-trichlorobutyramide
(g) N-(4-n-butoxy-α-methylbenzyl)-2,2,4-trichlorobutyramide
(h) N-(2-chloro-3-methoxy-6-methylbenzyl)-2,2,4-trichlorobutyramide
(i) N-(2-chloro-4-methylsulfonylbenzyl)-2,2,4-trichlorobutyramide
(j) N-(2-chloro-6-nitrobenzyl)-2,2,4-trichlorobutyramide
(k) N-(α-methyl-4-phenoxybenzyl)-2,2,4-trichlorotyramide
(l) N-(3,4,5-trimethoxybenzyl)-2,2,4-trichlorobutyramide
(m) N-(2-methylmercaptobenzyl)-2,2,4-trichlorobutyramide
(n) N-[3-(trifluoromethyl)benzyl]-2,2,4-trichlorobutyramide
(o) N-(4-dimethylaminophenethyl)-2,2,4-trichlorobutyramide Following a procedure similar to that described in Example 32B and substituting for N-(4-chlorobenzyl)-2,2,4-trichlorobutyramide an equivalent amount of:

(a) N-(5-phenylhexyl)-2,2,4-trichlorobutyramide
(b) N-(6-phenylhexyl)-2,2,4-trichlorobutyramide
(c) N-[3-(3,4-dichlorophenyl)propyl]-2,2,4-trichlorobutyramide
(d) N-benzyl-2,2,4-trichlorobutyramide
(e) N-(4-benzylbenzyl)-2,2,4-trichlorobutyramide
(f) N-(4-benzyloxybenzyl)-2,2,4-trichlorobutyramide
(g) N-(4-n-butoxy-α-methylbenzyl)-2,2,4-trichlorobutyramide
(h) N-(2-chloro-3-methoxy-6-methylbenzyl)-2,2,4-trichlorobutyramide
(i) N-(2-chloro-4-methylsulfonylbenzyl)-2,2,4-trichlorobutyramide
(j) N-(2-chloro-6-nitrobenzyl)-2,2,4-trichlorobutyramide
(k) N-(α-methyl-4-phenoxybenzyl)-2,2,4-trichlorobutyramide
(l) N-(3,4,5-trimethoxybenzyl)-2,2,4-trichlorobutyramide
(m) N-(2-methylmercaptobenzyl)-2,2,4-trichlorobutyramide
(n) N-[3-(trifluoromethyl)benzyl]-2,2,4-trichlorobutyramide
(o) N-(4-dimethylaminophenethyl)-2,2,4-trichlorobutyramide there can be obtained respectively, according to this invention:

(a) 3,3-dichloro-1-(5-phenylhexyl)-2-pyrrolidinone
(b) 3,3-dichloro-1-(6-phenylhexyl)-2-pyrrolidinone
(c) 3,3-dichloro-1-[3-(3,4-dichlorophenyl)propyl]-2-pyrrolidinone
(d) 3,3-dichloro-1-benzyl-2-pyrrolidinone
(e) 3,3-dichloro-1-(4-benzylbenzyl)-2-pyrrolidinone
(f) 3,3-dichloro-1-(4-benzyloxybenzyl)-2-pyrrolidinone
(g) 3,3-dichloro-1-(4-n-butoxy-α-methylbenzyl)-2-pyrrolidinone
(h) 3,3-dichloro-1-(2-chloro-3-methoxy-6-methylbenzyl)-2-pyrrolidinone
(i) 3,3-dichloro-1-(2-chloro-4-methylsulfonylbenzyl)-2-pyrrolidinone
(j) 3,3-dichloro-1-(2-chloro-6-nitrobenzyl)-2-pyrrolidinone
(k) 3,3-dichloro-1-(α-methyl-4-phenoxybenzyl)-2-pyrrolidinone
(l) 3,3-dichloro-1-(3,4,5-trimethoxybenzyl)-2-pyrrolidinone
(m) 3,3-dichloro-1-(2-methylmercaptobenzyl)-2-pyrrolidinone
(n) 3,3-dichloro-1-[3-(trifluoromethyl)benzyl]-2-pyrrolidinone
(o) 3,3-dichloro-1-(4-dimethylaminophenethyl)-2-pyrrolidinone

EXAMPLE 33

(A) N-(4-chlorophenethyl)-2,2,4-trichlorobutyramide

Following a procedure similar to that described in Example 32A and using 7.78 g. 2-(4-chlorophenyl)ethylamine, 4.4 g. sodium bicarbonate, and 10.5 g. 2,2,4-trichlorobutyryl chloride, there was obtained N-(4-chlorophenethyl)-2,2,4-trichlorobutyramide which was used as such in the next step.

(B) 3,3-dichloro-1-(4-chlorophenethyl)-2-pyrrolidinone

Following a procedure similar to that described in Example 32B and using the N-(4-chlorophenethyl)-2,2,4-trichlorobutyramine from Example 33A, there was obtained after recrystallization from methyl alcohol 6.3 g. 3,3-dichloro-1-(4-chlorophenethyl)-2-pyrrolidinone; M.P. 78–80° C.

EXAMPLE 34

(A) N-phenethyl-2,2,4-trichlorobutyramide

Following a procedure similar to that described in Example 32A and using 6.05 g. phenethylamine, 2.1 g. sodium hydroxide, and 10.5 g. 2,2,4-trichlorobutyryl chloride, there was obtained N-phenethyl-2,2,4-trichlorobutyramide as an orange oil which was used as such in the next step.

(B) 3,3-dichloro-1-phenethyl-2-pyrrolidinone

Following a procedure similar to that described in Example 32B and using the N-phenethyl-2,2,4-trichlorobutyramide from Example 34A and 2.1 g. sodium hydroxide, there was obtained after recrystallization from methyl alcohol-water 7.9 g. 3,3 - dichloro-1-phenethyl-2-pyrrolidinone; M.P. 84–85° C.

EXAMPLE 35

(A) N-[3-(3-indolyl)propyl]-2,2,4-trichlorobutyramide

Following a procedure similar to that described in Example 32A and using 6.8 g. 3-(3-indolyl)propylamine, 3.5 g. sodium bicarbonate, and 8.2 g. 2,2,4-trichlorobutyryl chloride, there was obtained 12.5 g. N-[3-(3-indolyl)propyl]-2,2,4-trichlorobutyramide as a brown gum which was used as such in the next step.

(B) 3,3-dichloro-1-[3-(3-indolyl)propyl]-2-pyrrolidinone

Following a procedure similar to that described in Example 32B and using 12.5 g. N-[3-(3-indolyl)propyl]-2,2,4-trichlorobutyramide from Example 35A and 1.6 g. sodium hydroxide there was obtained after recrystallization from methyl alcohol 4.2 g. 3,3-dichloro-1-[3-(3-indolyl)propyl]-2-pyrrolidinone; M.P. 103–105° C.

Following a procedure similar to that described in Example 32A and substituting for 4-chlorobenzylamine an equivalent amount of:

(a) 3-aminomethylindole
(b) 3-(2-aminoethyl)indole
(c) 3-(2-amino-1-methylethyl)-4-fluoroindole
(d) 3-(2-amino-2-methylethyl)-5-methoxyindole
(e) 3-(2-aminoethyl)-5-benzyloxy-2-methylindole
(f) 3-(2-aminoethyl)-4,7-dichloroindole
(g) 3-(2-aminoethyl)-5-methylmercaptoindole
(h) 3-(2-aminoethyl)-7-(trifluoromethyl)indole
(i) 3-(2-aminoethyl)-5-phenoxyindole
(j) 3-(2-aminoethyl)-6-dimethylaminoindole
(k) 3-(2-aminoethyl)-4,5,6-trimethoxyindole
(l) 3-(2-aminoethyl)-2-phenethylindole
(m) 3-(2-aminoethyl)-5-n-butoxyindole there can be obtained respectively, according to this invention:

(a) N-(3-indolylmethyl)-2,2,4-trichlorobutyramide
(b) N-[2-(3-indolyl)ethyl]-2,2,4-trichlorobutyramide
(c) N-[2-(4-fluoro-3-indolyl)-2-methylethyl]-2,2,4-trichlorobutyramide
(d) N-[2-(5-methoxy-3-indolyl)-1-methylethyl]-2,2,4-trichlorobutyramide
(e) N-[2-(5-benzyloxy-2-methyl-3-indolyl)ethyl]-2,2,4-trichlorobutyramide
(f) N-[2-(4,7-dichloro-3-indolyl)ethyl]-2,2,4-trichlorobutyramide
(g) N-[2-(5-methylmercapto-3-indolyl)ethyl]-2,2,4-trichlorobutyramide
(h) N-{2-[7-(trifluoromethyl)-3-indolyl]ethyl}-2,2,4-trichlorobutyramide
(i) N-[2-(5-phenoxy-3-indolyl)ethyl]-2,2,4-trichlorobutyramide
(j) N-[2-(6-dimethylamino-3-indolyl)ethyl]-2,2,4-trichlorobutyramide
(k) N-[2-(4,5,6-trimethoxy-3-indolyl)ethyl]-2,2,4-trichlorobutyramide
(l) N-[2-(2-phenethyl-3-indolyl)ethyl]-2,2,4-trichlorobutyramide
(m) N-[2-(5-n-butoxy-3-indolyl)ethyl]-2,2,4-trichlorobutyramide Following a procedure similar to that described in Example 32B and substituting for N-(4-chlorobenzyl)-2,2,4-trichlorobutyramide an equivalent amount of:

(a) N-(3-indolylmethyl)-2,2,4-trichlorobutyramide
(b) N-[2-(3-indolyl)ethyl]-2,2,4-trichlorobutyramide
(c) N-[2-(4-fluoro-3-indolyl)-2-methylethyl]-2,2,4-trichlorobutyramide
(d) N-[2-(5-methoxy-3-indolyl)-1-methylethyl]-2,2,4-trichlorobutyramide
(e) N-[2-(5-benzyloxy-2-methyl-3-indolyl)ethyl]-2,2,4-trichlorobutyramide
(f) N-[2-(4,7-dichloro-3-indolyl)ethyl]-2,2,4-trichlorobutyramide
(g) N-[2-(5-methylmercapto-3-indolyl)ethyl]-2,2,4-trichlorobutyramide
(h) N-{2-[7-(trifluoromethyl)-3-indolyl]ethyl}-2,2,4-trichlorobutyramide
(i) N-[2-(5-phenoxy-3-indolyl)ethyl]-2,2,4-trichlorobutyramide
(j) N-[2-(6-dimethylamino-3-indolyl)ethyl] 2,2,4-trichlorobutyramide
(k) N-[2-(4,5,6-trimethoxy-3-indolyl)ethyl] 2,2,4-trichlorobutyramide
(l) N-[2-(2-phenethyl-3-indolyl)ethyl] 2,2,4-trichlorobutyramide
(m) N-[2-(5-n-butoxy-3-indolyl)ethyl] 2,2,4-trichlorobutyramide there can be obtained respectively, according to this invention:

(a) 3,3-dichloro-1-(3-indolylmethyl-2-pyrrolidinone
(b) 3,3-dichloro-1-[2-(3-indolyl)ethyl]-2-pyrrolidinone
(c) 3,3-dichloro-1-[2-(4-fluoro-3-indolyl)-2-methylethyl]-2-pyrrolidinone
(d) 3,3-dichloro-1-[2-(5-methoxy-3-indolyl)-1-methylethyl]-2-pyrrolidinone
(e) 3,3-dichloro-1-[2-(5-benzyloxy-2-methyl-3-indolyl)ethyl]-2-pyrrolidinone
(f) 3,3-dichloro-1-[2-(4,7-dichloro-3-indolyl)ethyl] 2-pyrrolidinone
(g) 3,3-dichloro-1-[2-(5-methylmercapto-3-indolyl)ethyl]-2-pyrrolidinone
(h) 3,3-dichloro-1-{2-[7-(trifluoromethyl)-3-indolyl]ethyl}-2-pyrrolidinone
(i) 3,3-dichloro-1-[2-(5-phenoxy-3-indolyl)ethyl]-2-pyrrolidinone
(j) 3,3-dichloro-1-[2-(6-dimethylamino-3-indolyl)ethyl]-2-pyrrolidinone
(k) 3,3-dichloro-1-[2-(4,5,6-trimethoxy-3-indolyl)ethyl] 2-pyrrolidinone
(l) 3,3-dichloro-1-[2-(2-phenethyl-3-indolyl)ethyl] 2-pyrrolidinone
(m) 3,3-dichloro-1-[2-(5-n-butoxy-3-indolyl)ethyl] 2-pyrrolidinone

EXAMPLE 36

(A) N,N'-hexamethylene-bis(2,2,4-trichlorobutyramide)

To a stirred ice-cooled mixture of 11.0 g. hexamethylenediamine in 200 ml. ethylene dichloride and 8.5 g. sodium hydroxide in 100 ml. water was added 42.0 g. 2,2,4-trichlorobutyryl chloride dropwise during one-half hour and stirring was then continued at room temperature for two hours. The mixture was diluted with water, washed with saturated aqueous sodium bicarbonate solution, water, dilute aqueous hydrochloric acid solution, and saturated sodium chloride solution. The ethylene dichloride phase was separated, dried over magnesium sulfate, and evaporated to dryness to give on crystallization from hexane-ether 39.1 g. N,N'-hexamethylene-bis(2,2,4-trichlorobutyramide); M.P. 81–82° C.

(B) 1,1'-hexamethylene-bis(3,3-dichloro-2-pyrrolidinone)

To a solution of 10.0 g. N,N'-hexamethylene-bis(2,2,4-trichlorobutyramide) from Example 36A in 35 ml. dimethylsulfoxide was added 2.2 g. of a mixture of sodium hydride in mineral oil (52.9% sodium hydride) and the mixture was stirred for one hour with occasional cooling in order to maintain the reaction at room temperature. The resulting solution was heated on a steam bath until the pH reached seven and was then poured onto ice and extracted with chloroform. The chloroform solution was evaporated to dryness to yield after recrystallization from carbon tetrachlororide 4.1 g. 1,1'-hexamethylene-bis(3,3-dichloro-2-pyrrolidinone); M.P. 90.6–91.8° C. (corr.).

Following a procedure similar to that described in Example 36A and substituting for hexamethylenediamine an equivalent amount of:

(a) ethylenediamine
(b) octamethylenediamine
(c) dodecamethylenediamine
(d) 1,2-diamino-2-methylpropane there can be obtained respectively, according to this invention:

(a) N,N'-ethylene-bis(2,2,4-trichlorobutyramide)
(b) N,N'-octamethylene-bis(2,2,4-trichlorobutyramide)
(c) N,N'-dodecamethylene-bis(2,2,4-trichlorobutyramide)
(d) N,N'-(1,1-dimethylethylene)-bis(2,2,4-trichlorobutyramide)

Following a procedure similar to that described in Example 36A and substituting for 2,2,4-trichlorobutyryl chloride an equivalent amount of:

(a) 4-chlorobutyryl chloride
(b) 5-chlorovaleryl chloride
(c) 6-chlorohexanoyl chloride there can be obtained respectively:

(a) N,N'-hexamethylene-bis(4-chlorobutyramide)
(b) N,N'-hexamethylene-bis(4-chlorovaleramide)
(c) N,N'-hexamethylene-bis(6-chlorohexanamide)

Following a procedure similar to that described in Example 36B and substituting for N,N'-hexamethylene-bis(2,2,4-trichlorobutylramide) an equivalent amount of:

(a) N,N'-ethylene-bis(2,2,4-trichlorobutyramide)
(b) N,N'-octamethylene-bis(2,2,4-trichlorobutyramide)
(c) N,N'-dodecamethylene-bis(2,2,4-trichlorobutyramide)
(d) N,N'-(1,1-dimethylethylene)-bis(2,2,4-trichlorobutyramide)
(e) N,N'-hexamethylene-bis(4-chlorobutyramide)
(f) N,N'-hexamethylene-bis(5-chlorovaleramide)
(g) N,N'-hexamethylene-bis(6-chlorohexanamide)

there can be obtained respectively, according to this invention:

(a) 1,1'-ethylene-bis(3,3-dichloro-2-pyrrolidinone)
(b) 1,1'-octamethylene-bis(3,3-dichloro-2-pyrrolidinone)
(c) 1,1'-dodecamethylene-bis(3,3-dichloro-2-pyrrolidinone)
(d) 1,1'-(1,1-dimethylethylene)-bis(3,3-dichloro-2-pyrrolidinone)
(e) 1,1'-hexamethylene-bis(2-pyrrolidinone)
(f) 1,1'-hexamethylene-bis(2-piperidone)
(g) 1,1'-hexamethylene-bis(hexahydro-2H-azepin-2-one)

Following the general procedure hereinbefore described for the chlorination of a 2-oxopolymethylenimine and using the following:

(a) 1,1'-hexamethylene-bis(2-pyrrolidinone)
(b) 1,1'-hexamethylene-bis(2-piperidone)
(c) 1,1'-hexamethylene-bis(hexahydro-2H-azepin 2-one)

there can be obtained respectively:

(a) 1,1'-hexamethylene-bis(3,3-dichloro-2-pyrrolidinone)
(b) 1,1'-hexamethylene-bis(3,3-dichloro-2-piperidone)
(c) 1,1'-hexamethylene-bis(3,3-dichlorohexahydro-2H-azipin-2-one).

EXAMPLE 37

(A) N,N'-(4-xylylene)bis(2,2,4-trichlorobutyramide)

To a stirred, ice-cooled mixture of 6.8 g. 4,-xylylenediamine in 200 ml. ethylene dichloride and 4.2 g. sodium hydroxide in 100 ml. water was added 21 g. of 2,2,4-trichlorobutyryl chloride dropwise during fifteen minutes and stirring was continued for one-half hour. The resulting precipitate was collected by filtration and washed with water. The filtrate was washed with dilute aqueous hydrochloric acid solution and water, dried over sodium sulfate, and evaporated to dryness to yield, after combination with the crop obtained by filtration followed by trituration in ether-hexane, N,N'-(4-xylylene)bis(2,2,4-trichlorobutyramide); M.P. 93–98° C.

(B) 1,1'-(4-xylylene)bis(3,3-dichloro-2-pyrrolidinone)

To a stirred solution of the N,N'-(4-xylylene)bis(2,2,4-trichlorobutyramide), from Example 37A, in 200 ml. ethyl alcohol was added a solution of 4.2 g. sodium hydroxide in 42 ml. water. Stirring was continued for ten minutes and dilute aqueous hydrochloric acid solution was added until the solution turned acidic, followed by 300 ml. water. The resulting crystals were filtered to give after recrystallization from chloroformhexane 4.9 g. 1,1'-(4-xylylene)bis(3,3-dichloro - 2 - pyrrolidinone); M.P. 219.2–222.0° C. (dec.) (corr.).

Following a procedure similar to that described in Example 37A and substituting for 4-xylylenediamine an equivalent amount of:

(a) 2-xylylenediamine
(b) 3-xylylenediamine
(c) 2,2'-(4-phenylene)bis(ethylamine)
(d) 2,2'-(3-phenylene)bis(ethylamine)
(e) 2,2'-(2-phenylene)bis(ethylamine)
(f) 2,2'-(2,5-dimethyl-4-phenylene)bis(ethylamine)
(g) 5-tert-butyl-3-xylylenediamine
(h) 2,4,6-trimethyl-3-xylylenediamine
(i) 4-methoxy-6-methyl-3-xylylenediamine
(j) α,α'-dimethyl-4-xylylenediamine
(k) 2,5-dimethoxy-4-xylylenediamine
(l) 2,2'-(4-phenylene)bis(1-methylethylamine)

there can be obtained respectively, according to this invention:

(a) N,N'-(2-xylylene)bis(2,2,4-trichlorobutyramide)
(b) N,N'-(3-xylylene)bis(2,2,4-trichlorobutyramide)
(c) N,N'-[2,2'-(4-phenylene)bisethyl]bis(2,2,4-trichlorobutyramide)
(d) N,N'-[2,2'-(3-phenylene)bisethyl]bis(2,2,4-trichlorobutyramide)
(e) N,N'-[2,2'-(2-phenylene)bisethyl]bis(2,2,4-trichlorobutyramide)
(f) N,N'-[2,2'-(2,5-dimethyl-4-phenylene)bisethyl]bis(2,2,4-trichlorobutyramide)
(g) N,N'-(5-tert-butyl-3-xylylene)bis(2,2,4-trichlorobutyramide)
(h) N,N'-(2,4,6-trimethyl-3-xylylene)bis(2,2,4-trichlorobutyramide)
(i) N,N'-(4-methoxy-6-methyl-3-xylylene)bis(2,2,4-trichlorobutyramide)
(j) N,N'-(α,α'-dimethyl-4-xylylene)bis(2,2,4-trichlorobutyramide)
(k) N,N'-(2,5-dimethoxy-4-xylylene)bis(2,2,4-trichlorobutyramide)
(l) N,N'-[2,2'-(4-phenylene)bis(1-methylethyl)]bis(2,2,4-trichlorobutyramide)

Following a procedure similar to that described in Example 37A and substituting for 2,2,4-trichlorobutyryl chloride an equivalent amount of:

(a) 4-chlorobutyryl chloride
(b) 5-chlorovaleryl chloride
(c) 6-chlorohexanoyl chloride there can be obtained respectively:

(a) N,N'-(4-xylylene)bis(4-chlorobutyramide)
(b) N,N'-(4-xylylene)bis(5-chlorovaleramide)
(c) N,N'-(4-xylylene)bis(6-chlorohexanamide)

Following a procedure similar to that described in Example 37B and substituting for N,N'-(4-xylylene)bis(2,2,4-trichlorobutyramide) an equivalent amount of:

(a) N,N'-(2-xylylene)bis(2,2,4-trichloorbutyramide)
(b) N,N'-(3-xylylene)bis(2,2,4-trichlorobutyramide)
(c) N,N'-[2,2'-(4-phenylene)bisethyl]bis(2,2,4-trichlorobutyramide)
(d) N,N'-[2,2'-(3-phenylene)bisethyl]bis(2,2,4-trichlorobutyramide)
(e) N,N'-[2,2'-(2-phenylene)bisethyl]bis(2,2,4-trichlorobutyramide)
(f) N,N'-[2,2'-(2,5-dimethyl-4-phenylene)bisethyl]bis(2,2,4-trichlorobutyramide)
(g) N,N'-(5-tert-butyl-3-xylylene)bis(2,2,4-trichlorobutyramide)
(h) N,N'-(2,4,6-trimethyl-3-xylylene)bis(2,2,4-trichlorobutyramide)
(i) N,N'-(4-methoxy-6-methyl-3-xylylene)bis(2,2,4-trichlorobutyramide)
(j) N,N'-($\alpha,\alpha'$-dimethyl-4-xylylene)bis(2,2,4-trichlorobutyramide)
(k) N,N'-(2,5-dimethoxy-4-xylylene)bis(2,2,4-trichlorobutyramide)
(l) N,N'-[2,2'-(4-phenylene)bis(1-methylethyl)]bis(2,2,4-trichlorobutyramide)
(m) N,N'-(4-xylylene)bis(4-chlorobutyramide)
(n) N,N'-(4-xylylene)bis(5-chlorovaleramide)
(o) N,N'-(4-xylylene)bis(6-chlorohexanamide)

there can be obtained respectively, according to this invention:

(a) 1,1'-(2-xylylene)bis(3,3-dichloro-2-pyrrolidinone)
(b) 1,1'-(3-xylylene)bis(3,3-dichloro-2-pyrrolidinone)
(c) 1,1'-[2,2'-(4-phenylene)bisethyl]bis(3,3-dichloro-2-pyrrolidinone)
(d) 1,1'-[2,2'-(3-phenylene)bisethyl]bis(3,3-dichloro-2-pyrrolidinone)
(e) 1,1'-[2,2'-(2-phenylene)bisethyl]bis(3,3-dichloro-2-pyrrolidinone)
(f) 1,1'-[2,2'-(2,5-dimethyl-4-phenylene)bisethyl]bis(3,3-dichloro-2-pyrrolidinone)
(g) 1,1'-(5-tert-butyl-3-xylylene)bis(3,3-dichloro-2-pyrrolidinone)
(h) 1,1'-(2,4,6-trimethyl-3-xylylene)bis(3,3-dichloro-2-pyrrolidinone)
(i) 1,1'-(4-methoxy-6-methyl-3-xylylene)bis(3,3-dichloro-2-pyrrolidinone)
(j) 1,1'-($\alpha,\alpha'$-dimethyl-4-xylylene)bis(3,3-dichloro-2-pyrrolidinone)
(k) 1,1'-(2,5-dimethoxy-4-xylylene)bis(3,3-dichloro-2-pyrrolidinone)
(l) 1,1'-[2,2'-(4-phenylene)bis(1-methylethyl)]bis(3,3-dichloro-2-pyrrolidinone)
(m) 1,1'-(4-xylylene)bis(2-pyrrolidinone)
(n) 1,1'-(4-xylylene)bis(2-piperidone)
(o) 1,1'-(4-xylylene)bis(hexahydro-2H-azepin-2-one)

Following the general procedure hereinbefore described for the chloroination of a 2-oxopolymethylenimine and using the following:

(a) 1,1'-(4-xylylene)bis(2-pyrrolidinone)
(b) 1,1'-(4-xylylene(bis(2-piperidone)
(c) 1,1'-(4-xylylene)bis(hexahydro-2H-azepin-2-one)

there can be obtained respectively:

(a) 1,1'-(4-xylylene)bis(3,3-dichloro-2-pyrrolidinone)
(b) 1,1'1(4-xylylene)bis(3,3-dichloro-2-piperidone)
(c) 1,1'-(4-xylylene)bis(3,3-dichlorohexahydro-2H-azepin-2-one)

EXAMPLE 38

(A) N,N'-(2-chloro-1,4-phenylene)bis(2,2,4-trichlorobutyramide)

To a stirred, ice-cooled mixture of 6.02 g. 2-chloro-1,4-phenylenediamine in 150 ml. benzene and 6.15 g. sodium carbonate in 100 ml. water was added a solution of 11.5 g. 2,2,4-trichlorobutyryl chloride in 30 ml. benzene dropwise during twenty minutes and stirring was continued with cooling for fifteen minutes and at room temperature for one and one-half hours. The benzene layer was separated and washed with water, 0.5 N aqueous hydrochloric acid solution, water, 5% aqueous sodium bicarbonate solution, and water, dried over calcium sulfate and evaporated to dryness to yield on crystallization from hexane 8.33 g. N,N'-(2-chloro-1,4-phenylene)bis(2,2,4-trichlorobutyramide); M.P. 90.0–91.5° C.

(B) 1,1'-(2-chloro-1,4-phenylene)bis(3,3-dichloro-2-pyrrolidinone)

To a stirred mixture of 9.77 g. N,N'-(2-chloro-1,4-phenylene)bis(2,2,4-trichlorobutyramide) in 75 ml. ethyl alcohol was added 0.8 g. sodium hydroxide in 10 ml. water. When the pH of the mixture returned to seven another 0.8 g. sodium hydroxide in 10 ml. water was added and when the pH returned to seven it was adjusted to approximately thirteen by the addition of 50% aqueous sodium hydroxide solution. The mixture was diluted with water and the precipitate was filtered and washed with water to yield after recrystallization from acetone-hexane 5.8 g. 1,1' - (2 - chloro-1,4-phenylene)bis(3,3-dichloro-2-pyrrolidinone); M.P. 240–242° C. (dec.).

Following a procedure similar to that described in Example 38A and substituting for 2-chloro-1,4-phenylenediamine an equivalent amount of:

(a) 1,2-phenylenediamine
(b) 1,3-phenylenediamine
(c) 1,4-phenylenediamine
(d) 3,4-di(trifluoromethyl)-1,2-phenylenediamine
(e) 5-bromo-3,4-dimethyl-1,2-phenylenediamine
(f) 3,6-di-n-butoxy-1,2-phenylenediamine
(g) 4-n-butyl-1,2-phenylenediamine
(h) 4-tert-butyl-1,2-phenylenediamine
(i) 4,5-dichloro-1,2-phenylenediamine
(j) 4,6-diethylsulfonyl-1,3-phenylenediamine
(k) 4,6-diethylmercapto-1,3-phenylenediamine
(l) 4,5-dimethoxy-1,3-phenylenediamine
(m) 2,6-dinitro-4-methoxy-1,3-phenylenediamine
(n) 2,5-diethoxy-1,4-phenylenediamine
(o) 2-chloro-6-methoxy-1,4-phenylenediamine there can be obtained respectively, according to this invention:

(a) N,N'-(1,2-phenylene)bis(2,2,4-trichlorobutyramide)
(b) N,N'-(1,3-phenylene)bis(2,2,4-trichlorobutyramide)
(c) N,N'-(1,4-phenylene)bis(2,2,4-trichlorobutyramide)
(d) N,N'[3,4-di(trifluoromethyl)-1,2-phenylene]bis(2,2,4-trichlorobutyramide)
(e) N,N'-(5-bromo-3,4-dimethyl-1,2-phenylene)bis(2,2,4-trichlorobutyramide)
(f) N,N'-(3,6-di-n-butoxy-1,2-phenylene)bis(2,2,4-trichlorobutyramide)
(g) N,N'-(4-n-butyl-1,2-phenylene)bis(2,2,4-trichlorobutyramide)
(h) N,N'-(4-tert-butyl-1,2-phenylene)bis(2,2,4-trichlorobutyramide)
(i) N,N'-(4,5-dichloro-1,2-phenylene)bis(2,2,4-trichlorobutyramide)
(j) N,N'-(4,6-diethylsulfonyl-1,3-phenylene)bis(2,2,4-trichlorobutyramide)
(k) N,N'-(4,6-diethylmercapto-1,3-phenylene)bis(2,2,4-trichlorobutyramide)
(l) N,N'-(4,5-dimethoxy-1,3-phenylene)bis(2,2,4-trichlorobutyramide)
(m) N,N'-(2,6-dinitro-4-methoxy-1,3-phenylene)bis(2,2,4-trichlorobutyramide)
(n) N,N'-(2,5-diethoxy-1,4-phenylene)bis(2,2,4-trichlorobutyramide)
(o) N,N'-(2-chloro-6-methoxy-1,4-phenylene)bis(2,2,4-trichlorobutyramide)

By following a procedure similar to that described in Example 38A and substituting for 2,2,4-trichlorobutyryl chloride an equivalent amount of:

(a) 4-chlorobutyryl chloride
(b) 5-chlorovaleryl chloride
(c) 6-chlorohexanoyl chloride there can be obtained respectively:

(a) N,N'-(2-chloro-1,4-phenylene)bis(4-chlorobutyramide)
(b) N,N'-(2-chloro-1,4-phenylene)bis(5-chlorovaleramide)
(c) N,N-(2-chloro-1,4-phenylene)bis(6-chlorohexanamide)

Following a procedure similar to that described in Example 38B and substituting for N,N'-(2-chloro-1,4-phenylene)bis(2,2,4 - trichlorobutyramide) an equivalent amount of:

(a) N,N'-(1,2-phenylene)bis(2,2,4-trichlorobutyramide)
(b) N,N'-(1,3-phenylene)bis(2,2,4-trichlorobutyramide)
(c) N,N'-(1,4-phenylene)bis(2,2,4-trichlorobutyramide)
(d) N,N'-[3,4-di(trifluoromethyl)-1,2-phenylene]bis(2,2,4-trichlorobutyramide)
(e) N,N'(5-boro-3,4-dimethyl-1,2-phenylene)bis(2,2,4-trichlorobutyramide)
(f) N,N'-(3,6-di-n-butoxy-1,2-phenylene)bis(2,2,4-trichlorobutyramide)
(g) N,N'-(4-n-butyl-1,2-phenylene)bis(2,2,4-trichlorobutyramide)
(h) N,N'-(4-tert-butyl-1,2-phenylene)bis(2,2,4-trichlorobutyramide)
(i) N,N'-(4,5-dichloro-1,2-phenylene)bis(2,2,4-trichlorobutyramide)
(j) N,N'-(4,6-diethylsulfonyl-1,3-phenylene)bis(2,2,4-trichlorobutyramide)
(k) N,N'-(4,6-diethylmercapto-1,3-phenylene)bis(2,2,4-trichlorobutyramide)
(l) N,N'-(4,5-dimethoxy-1,3-phenylene)bis(2,2,4-trichlorobutyramide)
(m) N,N'-(2,6-dinitro-4-methoxy-1,3-phenylene)bis(2,2,4-trichlorobutyramide)
(n) N,N'-(2,5-diethoxy-1,4-phenylene)bis(2,2,4-trichlorobutyramide)
(o) N,N'-(2-chloro-6-methoxy-1,4-phenylene)bis(2,2,4-trichlorobutyramide)
(p) N,N'-(2-chloro-1,4-phenylene)bis(4-chlorobutyramide)
(q) N,N'-(2-chloro-1,4-phenylene)bis(5-chlorovaleramide)
(r) N,N'-(2-chloro-1,4-phenylene)bis(6-chlorohexanamide)

there can be obtained respectively, according to this invention:

(a) 1,1'-(1,2-phenylene)bis(3,3-dichloro-2-pyrrolidinone)
(b) 1,1'-(1,3-phenylene)bis(3,3-dichloro-2-pyrrolidinone)
(c) 1,1'-(1,4-phenylene)bis(3,3-dichloro-2-pyrrolidinone)
(d) 1,1'-[3,4-di(trifluoromethyl)-1,2-phenylene]bis(3,3-dichloro-2-pyrrolidinone)
(e) 1,1'-(5-bromo-3,4-dimethyl-1,2-phenylene)bis(3,3-dichloro-2-pyrrolidinone)
(f) 1,1'-(3,6-di-n-butoxy-1,2-phenylene)bis(3,3-dichloro-2-pyrrolidinone)
(g) 1,1'-(4-n-butyl-1,2-phenylene)bis(3,3-dichloro-2-pyrrolidinone)
(h) 1,1'-(4-tert-butyl-1,2-phenylene)bis(3,3-dichloro-2-pyrrolidinone)
(i) 1,1'-(4,5-dichloro-1,2-phenylene)bis(3,3-dichloro-2-pyrrolidinone)
(j) 1,1'-(4,6-diethylsulfonyl-1,3-phenylene)bis(3,3-dichloro-2-pyrrolidinone)
(k) 1,1'-(4,6-diethylmercapto-1,3-phenylene)bis(3,3-dichloro-2-pyrrolidinone)
(l) 1,1'-(4,5-dimethoxy-1,3-phenylene)bis(3,3-dichloro-2-pyrrolidinone)
(m) 1,1'-(2,6-dinitro-4-methoxy-1,3-phenylene)bis(3,3-dichloro-2-pyrrolidinone)
(n) 1,1'-(2,5-diethoxy-1,4-phenylene)bis(3,3-dichloro-2-pyrrolidinone)
(o) 1,1'-(2-chloro-6-methoxy-1,4-phenylene)bis(3,3-dichloro-2-pyrrolidinone)
(p) 1,1'-(2-chloro-1,4-phenylene)bis(2-pyrrolidinone)
(q) 1,1'-(2-chloro-1,4-phenylene)bis(2-piperidone)
(r) 1,1'-(2-chloro-1,4-phenylene)bis(hexahydro-2H-azepin-2-one)

Following the general procedure hereinbefore described for the chlorination of a 2-oxopolymethylenimine and using the following:

(a) 1,1'-(2-chloro-1,4-phenylene)bis(2-pyrrolidinone)
(b) 1,1'-(2-chloro-1,4-phenylene)bis(2-piperidone)
(c) 1,1'-(2-chloro-1,4-phenylene)bis(hexahydro-2H-azepin-2-one)

there can be obtained respectively:

(a) 1,1'-(2-chloro-1,4-phenylene)bis(3,3-dichloro-2-pyrrolidinone)
(b) 1,1'-(2-chloro-1,4-phenylene)bis(3,3-dichloro-2-piperidone)
(c) 1,1'-(2-chloro-1,4-phenylene)bis(3,3-dichlorohexahydro-2H-azepin-2-one)

EXAMPLE 39

(A) N,N'-(4-chloro-1,3-phenylene)bis(2,2,4-trichlorobutyramide)

Following a procedure similar to that described in Example 38A and using 7.12 g. 4-chloro-1,3-phenylenediamine, 11.24 g. sodium carbonate, and 21.0 g. 2,2,4-trichlorobutyryl chloride, there was obtained after crystallization from hexane 20.7 g. N,N'-(4-chloro-1,3-phenylene)bis(2,2,4-trichlorobutyramide); M.P. 90.5–92.0° C.

(B) 1,1'-(4-chloro-1,3-phenylene)bis(3,3-dichloro-2-pyrrolidinone)

Following a procedure similar to that described in Example 38B and using 17.15 g. N,N'-(4-chloro-1,3-phenylene)bis(2,2,4-trichlorobutyramide) from Example 39A and 2.8 g. sodium hydroxide there was obtained after recrystallization from methyl alcohol 11.1 g. 1,1'-(4-chloro-1,3-phenylene)bis(3,3 - dichloro - 2 - pyrrolidinone); M.P. 154–155° C.

EXAMPLE 40

(A) N,N'-(4-chloro-1,2-phenylene)bis(2,2,4-trichlorobutylramide)

Following a procedure similar to that described in Example 38A and using 7.13 g. 4-chloro-1,2-phenylenediamine, 5.62 g. sodium carbonate, and 21.0 g. 2.24-trichlorobutyryl chloride, there was obtained 19.0 g. N,N'-(4-chloro-1,2-phenylene)bis(2,2,4-trichlorobutyramide) as crystals.

(B) 1,1'-(4-chloro-1,2-phenylene)bis(3,3-dichloro-2-pyrrolidinone)

Following a procedure similar to that described in Example 38B and using 11.8 g. N,N'-(4-chloro-1,2-phenylene)-bis(2,2,4-trichlorobutyramide) from Example 40A and 3.88 g. sodium hydroxide, there was obtained after recrystallization from methyl alcohol 8.22 g. 1,1'-(4-chloro-1,2-p-phenylene)bis-(3,3 - dichloro - 2 - pyrrolidinone); M.P. 228–229° C.

EXAMPLE 41

(A) N,N'-(3,3'-dichloro-4,4'-biphenylylene)bis(2,2,4-trichlorobutyramide)

To a stirred mixture of 6.33 g. 3,3'-dichloro-4,4'-biphenyldiamine in 200 ml. benzene and 5.62 sodium carbonate in 60 ml. water, cooled to 10° C., was added a solution of 10.5 g. 2,2,4-trichlorobutyryl chloride in 50 ml. benzene dropwise during twenty minutes and stirring was continued twenty minutes at 10 to 15° C. and one and one-half hours at room temperature. The benzene phase was separated, washed with water, saturated aqueous sodium bicarbonate solution, water, 1 N aqueous hydrochloric acid solution and water, dried over calcium sulfate, and evaporated to dryness to yield N,N'-(3,3'-dichloro-4,4'-biphenylylene) bis(2,2,4-trichlorobutyramide) as a viscous oil which was used as such in the next step.

(B) 1,1'-(3,3'-dichloro-4,4'-biphenylylene)bis(3,3-dichloro-2-pyrrolidinone)

To a stirred mixture of the N,N'-(3,3'-dichloro-4,4'-biphenylylene)bis(2,2,4 - trichlorobutyramide) from Example 41A in 100 ml. ethyl alcohol was added a solution of 1.0 g. sodium hydroxide in 20 ml. water and when the pH returned to seven another solution of 1.0 g. sodium hydroxide in 20 ml. water was added and finally the pH was adjusted to approximately thirteen by the addition of a few drops of 50% aqueous sodium hydroxide solution. The mixture was diluted with water and the resulting precipitate was filtered to yield after recrystallization successively from acetone and chloroform 5.07 g. 1,1'-(3,3'-dichloro-4,4'-biphenylene)bis(3,3 - dichloro - 2 - pyrrolidinone); M.P. 265–266° C. (edc.).

Following a procedure similar to that described in Example 41A and substituting for 3,3'-dichloro-4,4'-biphenyldiamine an equivalent amount of:

(a) 2,2'-biphenyldiamine
(b) 2,3'-biphenyldiamine
(c) 2,4'-biphenyldiamine
(d) 3,3'-biphenyldiamine
(e) 3,4'-biphenyldiamine
(f) 4,4'-biphenyldiamine
(g) 3,3'-dihexyloxy-4,4'-biphenyldiamine
(h) 4,5'-dinitro-2,2-biphenyldiamine
(i) 5-chloro-2,4'-biphenyldiamine
(j) 2,2',4,4',6,6'-hexamethyl-3,3'-biphenyldiamine
(k) 4,4'-di(trifluoromethyl)-2,2'-biphenyldiamine
(l) 2',5,6'-tribromo-6-iodo-3,4'-biphenyldiamine
(m) 4,4'-dimethylmercapto-3,3'-biphenyldiamine
(n) 2,2'-dichloro-5,5'-diethoxy-4,4'-biphenyldiamine
(o) 3,3'-diethyl-4,4'-biphenyldiamine
(p) 3,3'-diphenethyloxy-4,4'-biphenyldiamine
(q) 3,3'-diphenoxy-4,4'-biphenyldiamine
(r) 3-methylsulfonyl-4,4'-biphenyldiamine
(s) 3',5'-dibromo-4-nitro-2,4'-biphenyldiamine there can be obtained respectively, according to this invention:

(a) N,N'-(2,2'-biphenylylene)bis(2,2,4-trichlorobutyramide)
(b) N,N'-(2,3'-biphenylylene)bis(2,2,4-trichlorobutyramide)
(c) N,N'-(2,4'-biphenylylene)bis(2,2,4-trichlorobutyramide)
(d) N,N'-(3,3'-biphenylylene)bis(2,2,4-trichlorobutyramide)
(e) N,N'-(3,4'-biphenylylene)bis(2,2,4-trichlorobutyramide)
(f) N,N'-(4,4'-biphenylylene)bis(2,2,4-trichlorobutyramide)
(g) N,N'-(3,3'-dihexyloxy-4,4'-biphenylylene)bis 2,2,4-trichlorobutyramide)
(h) N,N'-(4,5'-dinitro-2,2'-biphenylylene)bis(2,2,4-trichlorobutyramide)
(i) N,N'-(5-chloro-2,4'-biphenylylene)bis(2,2,4-trichlorobutyramide)
(j) N,N'-(2,2',4,4',6,6'-hexamethyl-3,3'-biphenylene)bis-2,2,4-trichlorobutyramide)
(k) N,N'-[4,4'-di(trifluoromethyl)2,2'-biphenylylene)bis(2,2,4-trichlorobutyramide)
(l) N,N'-(2',5,6'-tribromo-6-iodo-3,4'-biphenylylene) bis(2,2,4-trichlorobutyramide)
(m) N,N'-(4,4'-dimethylmercapto-3,3'-biphenylylene) bis(2,2,4-trichlorobutyramide)
(n) N,N'-(2,2'-dichloro-5,5'-diethoxy-4,4'-biphenylylene)bis-(2,2,4-trichlorobutyramide)
(o) N,N'-(3,3'-diethyl-4,4'-biphenylylene)bis(2,2,4-trichlorobutyramide)
(p) N,N'-(3,3'-diphenethyloxy-4,4'-biphenylylene) bis(2,2,4-trichlorobutyramide)
(q) N,N'-(3,3'-diphenoxy-4,4'-biphenylylene)bis(2,2,4-trichlorobutyramide)
(r) N,N'-(3-methylsulfonyl-4,4'-biphenylylene)bis (2,2,4-trichlorobutyramide)
(s) N,N'-(3',5'-dibromo-4-nitro-2,4'-biphenylylene) bis(2,2,4-trichlorobutyramide)

Following a procedure similar to that described in Example 41A and substituting for 2,2,4-trichlorobutyryl chloride an equivalent amount of:

(a) 4-chlorobutyryl chloride
(b) 5-chlorovaleryl chloride
(c) 6-chlorohexanoyl chloride there can be obtained respectively
(a) N,N'-(3,3'-dichloro-4,4'-biphenylylene)bis(4-chlorobutyramide)
(b) N,N'-(3,3'-dichloro-4,4'-biphenylylene)bis(5-chlorovaleramide)
(c) N,N'-(3,3'-dichloro-4,4'-biphenylylene)bis(6-chlorohexanamide)

Following a procedure similar to that described in Example 41B and substituting for N,N'-(3,3'-dichloro-4,4' - biphenylene)bis(2,2,4 - trichlorobutyramide) an equivalent amount of:

(a) N,N'-(2,2'-biphenylylene)bis(2,2,4-trichlorobutyramide)
(b) N,N'-(2,3'-biphenylylene)bis(2,2,4-trichlorobutyramide)
(c) N,N'-(2,4'-biphenylylene)bis(2,2,4-trichlorobutyramide)
(d) N,N'-(3,3'-biphenylylene)bis(2,2,4-trichlorobutyramide)
(e) N,N'-(3,4'-biphenylylene)bis(2,2,4-trichlorobutyramide)
(f) N,N'-(4,4'-biphenylylene)bis(2,2,4-trichlorobutyramide)
(g) N,N'-(3,3'-dihexyloxy-4,4'-biphenylylene)bis (2,2,4-trichlorobutyramide)
(h) N,N'-(4,5'-dinitro-2,2'-biphenylylene)bis(2,2,4-trichlorobutyramide)
(i) N,N'-(5-chloro-2,4'-biphenylylene)bis(2,2,4-trichlorobutyramide
(j) N,N'-(2,2',4,4',6,6'-hexamethyl-3,3'-biphenylylene) bis(2,2,4-trichlorobutyramide)
(k) N,N'-[4,4'-di(trifluoromethyl)-2,2'-biphenylylene] bis(2,2,4-trichlorobutyramide)
(l) N,N'-(2',5,6'-tribromo-6-iodo-3,4'-biphenylylene) bis(2,2,4-trichlorobutyramide)
(m) N,N'-(4,4'-dimethylmercapto-3,3'-biphenylylene) bis(2,2,4-trichlorobutyramide)
(n) N,N'-(2,2'-dichloro-5,5'-diethoxy-4,4'-biphenylylene)bis-(2,2,4-trichlorobutyramide)
(o) N,N'-(3,3'-diethyl-4,4'-biphenylylene)bis(2,2,4-trichlorobutyramide)
(p) N,N'-(3,3'-diphenethyloxy-4,4'-biphenylylene) bis(2,2,4-trichlorobutyramide)
(q) N,N'-(3,3'-diphenoxy-4,4'-biphenylylene)bis (2,2,4-trichlorobutyramide)
(r) N,N'-(3-methylsulfonyl-4,4'-biphenylylene)bis 2,2,4-trichlorobutyramide)
(s) N,N'-(3',5'-dibromo-4-nitro-2,4'-biphenylylene) bis(2,2,4-trichlorobutyramide)
(t) N,N'-(3,3'-dichloro-4,4'-biphenylylene)bis(4-chlorobutyramide)
(u) N,N'-(3,3'-dichloro-4,4'-biphenylylene)bis(5-chlorovaleramide)

(v) N,N'-(3,3'-dichloro-4,4'-biphenylylene)bis(6-chlorohexanamide)

there can be obtained respectively, according to this invention:

(a) 1,1'-(2,2'-biphenylylene)bis(3,3-dichloro-2-pyrrolidinone)
(b) 1,1'-(2,3'-biphenylylene)bis(3,3-dichloro-2-pyrrolidinone
(c) 1,1'-(2,4'-biphenylylene)bis(3,3'-dichloro-2-pyrrolidinone)
(d) 1,1'-(3,3'-biphenylylene)bis(3,3-dichloro-2-pyrrolidinone)
(e) 1,1'-(3,4'-biphenylylene)bis(3,3-dichloro-2-pyrrolidinone)
(f) 1,1'-(4,4'-biphenylylene)bis(3,3-dichloro-2-pyrrolidinone)
(g) 1,1'-(3,3'-dihexyloxy-4,4'-biphenylylene)bis(3,3-dichloro-2-pyrrolidinone)
(h) 1,1'-(4,5'-dinitro-2,2'-biphenylylene)bis-(3,3-dichloro-2-pyrrolidinone)
(i) 1,1'-(5-chloro-2,4'-biphenylylene)bis-(3,3-dichloro-2-pyrrolidinone)
(j) 1,1'-(2,2',4,4',6,6'-hexamethyl-3,3'-biphenylylene)bis(3,3-dichloro-2-pyrrolidinone)
(k) 1,1'-(4,4'-di(trifluoromethyl)-2,2'-biphenylylene)bis(3,3-dichloro-2-pyrrolidinone)
(l) 1,1'-(2',5,6'-tribromo-6-iodo-3,4'-biphenylylene)bis-(3,3-dichloro-2-pyrrolidinone)
(m) 1,1'-(4,4'-dimethylmercapto-3,3'-biphenylylene)bis-(3,3-dichloro-2-pyrrolidinone)
(n) 1,1'-(2,2'-dichloro-5,5'-diethoxy-4,4'-biphenylylene)bis(3,3-dichloro-2-pyrrolidinone)
(o) 1,1'-(3,3'-diethyl-4,4'-biphenylylene)bis-(3,3-dichloro-2-pyrrolidinone)
(p) 1,1'-(3,3'-diphenethyloxy-4,4'-biphenylylene)bis-(3,3-dichloro-2-pyrrolidinone)
(q) 1,1'-(3,3'-diphenoxy-4,4'-biphenylylene)bis-(3,3-dichloro-2-pyrrolidinone)
(r) 1,1'-(3-methylsulfonyl-4,4'-biphenylene)bis-(3,3-dichloro-2-pyrrolidinone)
(s) 1,1'-(3',5'-dibromo-4-nitro-2,4'-biphenylylene)bis-(3,3-dichloro-2-pyrrolidinone)
(t) 1,1'-(3,3'-dichloro-4,4'-biphenylylene)bis-(2-pyrrolidinone)
(u) 1,1'-(3,3'-dichloro-4,4'-biphenylylene)bis-(2-piperidone)
(v) 1,1'-(3,3'-dichloro-4,4'-biphenylylene)bis-(hexahydro-2H-azepin-2-one)

Following the general procedure hereinbefore described for the chlorination of a 2-oxopolymethylenimine and using the following:

(a) 1,1'-(3,3'-dichloro-4,4'-biphenylylene)bis-(2-pyrrolidinone)
(b) 1,1'-(3,3'-dichloro-4,4'-biphenylylene)bis-(2-piperidone)
(c) 1,1'-(3,3'-dichloro-4,4'-biphenylylene)bis-(hexahydro-2H-azepin-2-one)

there can be obtained:

(a) 1,1'-(3,3'-dichloro-4,4'-biphenylylene)bis-(3,3-dichloro-2-pyrrolidinone)
(b) 1,1'-(3,3'-dichloro-4,4'-biphenylylene)bis-(3,3-dichloro-2-piperidone)
(c) 1,1'-(3,3'-dichloro-4,4'-biphenylylene)bis-(3,3-dichlorohexahydro-2H-azepin-2-one)

EXAMPLE 42

(A) N-(2,6-dimethyl-4-pyrimidyl)-2,2,4-trichlorobutyramide

To a stirred solution of 15.0 g. 4-amino-2,6-dimethylpyrimidine in 500 ml. ethylene dichloride and 13.0 g. sodium carbonate in 100 ml. water, at room temperature, was added 26 g. 2,2,4-trichlorobutyryl chloride in 50 ml. ethylene dichloride dropwise during forty-five minutes and stirring was continued for four and one-half hours. The ethylene dichloride layer was separated, washed with water, dried over sodium sulfate, and evaporated to dryness to yield 22 g. of N-(2,6-dimethyl-4-pyrimidyl)-2,2,4-trichlorobutyramide as a yellow oil which was used as such in the next step.

(B) 3,3-dichloro-1-(2,6-dimethyl-4-pyrimidyl)-2-pyrrolidinone

To a stirred ice-cooled solution of 20 g. N-(2,6-dimethyl-4-pyrimidyl)-2,2,4-trichlorobutyramide, from Example 42A, in 200 ml. methyl alcohol was added a solution of 2.4 g. sodium hydroxide in 10 ml. water and stirring was continued for one hour. The mixture was evaporated to a small volume and extracted with ethylene dichloride. The extract was washed with water, dried over sodium sulfate and evaporated to dryness to yield, after trituration with cold ether and recrystallization from methyl alcohol-water and ether-hexane, 5.98 g. 3,3-dichloro-1-(2,6 - dimethyl - 4 - pyrimidyl)-2-pyrrolidinone; M.P. 99–100° C.

Following a procedure similar to that described in Example 42A and substituting for 4-amino-2,6-dimethylpyrimidine an equivalent amount of:

(a) 2-aminopyrimidine
(b) 4-aminopyrimidine
(c) 5-aminopyrimidine
(d) 4-amino-5-bromo-6-chloro-2-methylmercaptopyrimidine
(e) 5-amino-2,4-bis(dimethylamino)pyrimidine
(f) 4-amino-2-n-butyl-6-chloro-5-nitropyrimidine
(g) 4-amino-6-(trifluoromethyl)pyrimidine
(h) 2-amino-5-benzyl-4-chloropyrimidine
(i) 5-amino-2,4-diphenoxypyrimidine
(j) 4-amino-2-ethylsulfonyl-5-methylpyrimidine
(k) 2-amino-5-n-butoxypyrimidine
(l) 5-amino-4-chloro-6-methoxy-2-methylpyrimidine
(m) 4-amino-5-hexyl-2-propylpyrimidine
(n) 2-acetamido-5-aminopyrimidine there can be obtained respectively, according to this invention:

(a) N-(2-pyrimidyl)-2,2,4-trichlorobutyramide
(b) N-(4-pyrimidyl)-2,2,4-trichlorobutyramide
(c) N-(5-pyrimidyl)-2,2,4-trichlorobutyramide
(d) N-(5-bromo-6-chloro-2-methylmercapto-4-pyrimidyl)-2,2,4-trichlorobutyramide
(e) N-[2,4-bis(dimethylamino)5-pyrimidyl]-2,2,4-trichlorobutyramide
(f) N-(2-n-butyl-6-chloro-5-nitro-4-pyrimidyl)-2,2,4-trichlorobutyramide
(g) N-[6-(trifluoromethyl)-4-pyrimidyl]-2,2,4-trichlorobutyramide
(h) N-(5-benzyl-4-chloro-2-pyrimidyl)-2,2,4-trichlorobutyramide
(i) N-(2,4-diphenoxy-5-pyrimidyl)-2,2,4-trichlorobutyramide
(j) N-(2-ethylsulfonyl-5-methyl-4-pyrimidyl)-2,2,4-trichlorobutyramide
(k) N-(5-n-butoxy-2-pyrimidyl)-2,2,4-trichlorobutyramide
(l) N-(4-chloro-6-methoxy-2-methyl-5-pyrimidyl)-2,2,4-trichlorobutyramide
(m) N-(5-hexyl-2-propyl-4-pyrimidyl)-2,2,4-trichlorobutyramide
(n) N-(2-acetamido-5-pyrimidyl)-2,2,4-trichlorobutyramide Following a procedure similar to that described in Example 42B and substituting for N-(2,6-dimethyl-4-pyrimidyl) - 2,2,4 - trichlorobutyramide an equivalent amount of:

(a) N-(2-pyrimidyl)-2,2,4-trichlorobutyramide
(b) N-(4-pyrimidyl)-2,2,4-trichlorobutyramide (c) N-(5-pyrimidyl)-2,2,4-trichlorobutyramide
(d) N-(5-bromo-6-chloro-2-methylmercapto-4-pyrimidyl)-2,2,4-trichlorobutyramide
(e) N-[2,4-bis(dimethylamino)-5-pyrimidyl]-2,2,4-trichlorobutyramide
(f) N-(2-n-butyl-6-chloro-5-nitro-4-pyrimidyl)-2,2,4-trichlorobutyramide
(g) N-[6-(trifluoromethyl)-4-pyrimidyl]-2,2,4-trichlorobutyramide
(h) N-(5-benzyl-4-chloro-2-pyrimidyl)-2,2,4-trichlorobutyramide
(i) N-(2,4-diphenoxy-5-pyrimidyl)-2,2,4-trichlorobutyramide
(j) N-(2-ethylsulfonyl-5-methyl-4-pyrimidyl)-2,2,4-trichlorobutyramide
(k) N-(5-n-butoxy-2-pyrimidyl)-2,2,4-trichlorobtuyramide
(l) N-(4-chloro-6-methoxy-2-methyl-5-pyrimidyl)-2,2,4-trichlorobutyramide
(m) N-(5-hexyl-2-propyl-4-pyrimidyl)-2,2,4-trichlorobutyramide
(n) N-(2-acetamido-5-pyrimidyl)-2,2,4-trichlorobutyramide there can be obtained respectively, according to this invention:

(a) 3,3-dichloro-1-(2-pyrimidyl)-2-pyrrolidinone
(b) 3,3-dichloro-1-(4-pyrimidyl)-2-pyrrolidinone
(c) 3,3-dichloro-1-(5-pyrimidyl)-2-pyrrolidinone
(d) 3,3-dichloro-1-(5-bromo-6-chloro-2-methylmercapto-4-pyrimidyl)-2-pyrrolidinone
(e) 3,3-dichloro-1-[2,4-bis(dimethylamino)-5-pyrimidyl]-2-pyrrolidinone
(f) 3,3-dichloro-1-(2-n-butyl-6-chloro-5-nitro-4-pyrimidyl)-2-pyrrolidinone
(g) 3,3-dichloro-1-[6-(trifluoromethyl)-4-pyrimidyl]-2-pyrrolidinone
(h) 3,3-dichloro-1-(5-benzyl-4-chloro-2-pyrimidyl)-2-pyrrolidinone
(i) 3,3-dichloro-1-(2,4-diphenoxy-5-pyrimidyl)-2-pyrrolidinone
(j) 3,3-dichloro-1-(2-ethylsulfonyl-5-methyl-4-pyrimidyl)-2-pyrrolidinone
(k) 3,3-dichloro-1-(5-n-butoxy-2-pyrimidyl)-2-pyrrolidinone
(l) 3,3-dichloro-1-(4-chloro-6-methoxy-2-methyl-5-pyrimidyl)-2-pyrrolidinone
(m) 3,3-dichloro-1-(5-hexyl-2-propyl-4-pyrimidyl)-2-pyrrolidinone
(n) 3,3-dichloro-1-(2-acetamido-5-pyrimidyl)-2-pyrrolidinone By treating 3,3-dichloro-1-(2-acetamido-5-pyrimidyl)-2-pyrrolidinone in absolute ethyl alcohol, at room temperature, with an ethereal solution containinng an amount of hydrogen chloride slightly in excess of that required to hydrolyze the acetamido group, there can be obtained the hydrochloride salt of 3,3-dichloro-1-(2-amino-5-pyrimidyl)-2-pyrrolidinone which can be converted to the free base by dissolving the salt in ethyl alcohol and treating the resulting solution with an equivalent amount of sodium carbonate in water.

EXAMPLE 43

(A) N-(4-chlorophenyl)-5-chlorovaleramide

To a stirred ice-cooled solution of 51 g. 4-chloroaniline and 45.1 g. triethylamine in 1300 ml. dry methylene dichloride was added a solution of 68.8 g. 5-chlorovaleryl chloride in 200 ml. dry methylene dichloride dropwise during one hour and stirring was continued one hour with cooling and one hour at room temperature. The resulting solution was washed with water, saturated aqueous sodium bicarbonate solution and water, dried over anhydrous calcium sulfate and evaporated to dryness under reduced pressure to give after recrystallization from ethyl acetate-hexane 91.9 g. N-(4-chlorophenyl)-5-chlorovaleramide; M.P. 109.5–110° C.

(B) N-(4-chlorophenyl)-2-piperidone

To a solution of 24.6 g. N-(4-chlorophenyl)-5-chlorovaleramide in 250 ml. ethyl alcohol was added 40 ml. of an aqueous solution containing 4 g. sodium hydroxide as follows: initially 10 ml. of solution was added and when the reaction solution became neutral another 10 ml. of solution was added. Finally when the reaction solution again became neutral 20 ml. of solution was added, stirring was continued for three hours and the resulting mixture was filtered and the filtrate was evaporated to dryness under reduced pressure. The residue was taken up in etner, the mixture was filtered and the filtrate was evaporated to dryness to give after recrystallization from hexane 18.6 g. N-(4-chlorophenyl)-2-piperidone; M.P. 69.5–70.5° C.

(C) 3,3-dichloro-N-(4-chlorophenyl)-2-piperidone

To a stirred slurry of 31.24 g. phosphorus pentachloride in 100 ml. xylene at room temperature was added a solution of 10.48 g. N-(4-chlorophenyl)-2-piperidone in 75 ml. xylene dropwise during twenty-five minutes. The mixture was slowly heated to 89° during forty-five minutes, heating was continued one-half hour, and the mixture was evaporated to dryness under reduced pressure and the residue was stirred with 400 ml. 10% aqueous sodium carbonate and ice. The resulting solid was collected by filtration to give after recrystallization from and charcoal treatment in methanol 8.05 g. 3,3-dichloro-N-(4-chlorophenyl)-2-piperidone; M.P. 145–146.5° C.

EXAMPLE 44

(A) N-(4-fluorophenyl)-5-chlorovaleramide

Following a procedure similar to that described in Example 43A and using 11.11 g. 4-fluoroaniline and 12.65 g. triethylamine in 340 ml. dry methylene dichloride and 17.04 g. 5-chlorovaleryl chloride in 220 ml. dry methylene dichloride there was obtained after recrystallization from ethyl acetate-hexane 19.12 g. N-(4-fluorophenyl)-5-chlorovaleramide; M.P. 81.5–83° C.

(B) N-(4-fluorophenyl)-2-piperidone

Following a procedure similar to that described in Example 43B and using 11.48 g. N-(4-fluorophenyl)-4-chlorovaleramide in 100 ml. ethyl alcohol and 25 ml. of an aqueous solution containing 2 g. sodium hydroxide there was obtained after recrystallization from hexane 6.35 g. N-(fluorophenyl)-2-piperidone; M.P. 102–104° C.

(C) 3,3-dichloro-N-(4-fluorophenyl)-2-piperidone

Following a procedure similar to that described in Example 43C and using 31.3 g. phosphorus pentachloride in 100 ml. xylene and 9.66 g. of N-(4-fluorophenyl)-2-piperidone in 120 ml. xylene there was obtained after recrystallization from methanol 7.04 g. 3,3-dichloro-N-(4-fluorophenyl)-2-piperidone; M.P. 140.5–141.5° C.

EXAMPLE 45

(A) N-(4-bromophenyl)-5-chlorovaleramide

Following a procedure similar to that described in Example 43A and using 8.6 g. 4-bromoaniline and 6.06 g. triethylamine in 300 ml. dry methylene dichloride and 8.52 g. 5-chlorovaleryl chloride in 125 ml. dry methylene dichloride there was obtained after recrystallization from ethyl acetate-hexane 11.65 g. N - (4 - bromophenyl)-5-chlorovaleramide; M.P. 100–101° C.

(B) N-(4-bromophenyl)-2-piperidone

Following a procedure similar to that described in Example 43B and using 14.53 g. N-(4-bromophenyl)-5-chlorovaleramide in 175 ml. ethyl alcohol and 10 ml. of an aqueous solution containing 2 g. sodium hydroxide there was obtained after recrystallization from hexane 11.02 g. N-(4-bromophenyl)-2-piperidone; M.P. 78.5–80° C.

(C) 3,3-dichloro-N-(4-bromophenyl)-2-piperidone

Following a procedure similar to that described in Example 43C and using 13.9 g. phosphorus pentachloride in 100 ml. xylene and 5.66 g. N-(4-bromophenyl)-2-piperidone in 150 ml. xylene there was obtained after recrystallization from methanol and ethyl acetate-hexane 2.48 g. 3,3-dichloro-N-(4-bromophenyl)-2-piperidone; M.P. 159–160.6° C.

EXAMPLE 46

(A) N-[4-chloro-2-(trifluoromethyl)phenyl]-5-chlorovaleramide

Following a procedure similar to that described in Example 43A and using 19.56 g. 4-chloro-2-(trifluoromethyl)aniline and 12.2 g. triethylamine in 400 ml. dry methylene dichloride and 17.04 g. 5-chlorovaleryl chloride in 250 ml. dry methylene dichloride there was obtained after recrystallization from ethyl acetate-hexane 16.6 g. N - [4 - chloro - 2 - (trifluoromethyl)phenyl]-5-chlorovaleramide; M.P. 109–111° C.

(B) -[4-chloro-2-(trifluoromethyl)phenyl]-2-piperidone

Following a procedure similar to that described in Example 43B and using 11 g. N-[4-chloro-2-(trifluoromethyl)-phenyl]-5-chlorovaleramide in 100 ml. ethyl alcohol and 10 ml. of an aqueous solution containing 1.10 g. sodium hydroxide there was obtained after recrystallization from hexane 6.38 g. N-[4-chloro-2-(trifluoromethyl) phenyl]-2-piperidone; M.P. 78.5–80° C.

(C) 3,3-dichloro-N-[4-chloro-2-(trifluoromethyl) phenyl]-2-piperidone

Following a procedure similar to that described in Example 43C and using 12.51 g. phosphorus pentachloride in 100 ml. xylene and 5.55 g. N-[4-chloro-2-(trifluoromethyl)phenyl]-2-piperidone in 100 ml. xylene there was obtained after recrystallization from hexane 3.98 g. 3,3-dichloro - N - [4 - chloro - 2 - (trifluoromethyl)phenyl]-2-piperidone; M.P. 140–141° C.

EXAMPLE 47

(A) N-(2,4-difluorophenyl)-5-chlorovaleramide

Following a procedure similar to that described in Example 43A and using 9.69 g. 4-toluidine and 9.12 g. triethylamine in 350 ml. dry methylene dichloride and 12.4 g. 5-chlorovaleryl chloride in 225 ml. dry methylene dichloride there was obtained after recrystallization from ethyl acetate-hexane 16.5 g. N-(2,4-difluorophenyl)-5-chlorovaleramide; M.P. 82–83° C.

(B) N (2,4-difluorophenyl)-2-piperidone

Following a procedure similar to that described in Example 43B and using 14.86 g. N-(2,4-difluorophenyl)-5-chlorovaleramide in 200 ml. ethyl alcohol and 25 ml. of an aqueous solution containing 2.4 g. sodium hydroxide there was obtained after recrystallization from hexane 11.75 g. N-(2,4-difluorophenyl)-2-piperidone; M.P. 120–121° C.

(C) 3,3-dichloro-N-(2,4-difluorophenyl)-2-piperidone

Following a procedure similar to that described in Example 43C and using 25 g. phosphorus pentachloride in 150 ml. xylene and 8.45 g. N-(2,4-difluorophenyl)-2-piperidone in 150 ml. xylene there was obtained after recrystallization from hexane 8.96 g. 3,3-dichloro-N-(2,4-difluorophenyl-2-piperidone; M.P. 114–115° C.

EXAMPLE 48

(A) N-[4-(trifluoromethyl)phenyl]-5-chlorovaleramide

Following a procedure similar to that described in Example 43A and using 12.1 g. 4-(trifluoromethyl)aniline and 9.12 g. triethylamine in 350 ml. dry methylene dichloride and 12.4 g. 5-chlorovaleryl chloride in 240 ml. dry methylene dichloride there was obtained after recrystallization from ethyl acetate-hexane 17.4 g. N-[4-(trifluoromethyl)phenyl]-5-chlorovaleramide; M.P. 103–104° C.

(B) N-[4-(trifluoromethyl)phenyl]-2-piperidone

Following a procedure similar to that described in Example 43B and using 11.19 g. N-[4-trifluoromethyl)phenyl]-5-chlorovaleramide in 100 ml. ethyl alcohol and 10 ml. of an aqueous solution containing 1.6 g. sodium hydroxide there was obtained after recrystallization from hexane 8.46 g. N-[4-(trifluoromethyl)phenyl]-2-piperidone; M.P. 83–84.5° C.

(C) 3,3-dichloro-N-[4-(-trifluoromethyl) phenyl]-2-piperidone

Following a procedure similar to that described in Example 43C and using 13.43 g. phosphorus pentachloride in 100 ml. xylene and 5.23 g. N-[4-(trifluoromethyl) phenyl]-2-piperidone in 50 ml. xylene there was obtained after recrystallization from methyl alcohol 4.35 g. 3,3-dichloro - N -[4- (trifluoromethyl)phenyl]-2-piperidone; M.P. 135.5–137° C.

EXAMPLE 49

(A) N-(4-tolyl)-5-chlorovaleramide

Following a procedure similar to that described in Example 43A and using 10.72 g. 4-toluidine and 2.1 g. triethylamine in 400 ml. dry methylene dichloride and 17.04 g. 5-chlorovaleryl chloride in 250 ml. dry methylene dichloride there was obtained after recrystallization from benzene-hexane and ethyl acetate-hexane 20.25 g. N-(4-tolyl)-5-chlorovaleramide.

(B) N-(4-tolyl)-2-piperidone

Following a procedure similar to that described in Example 43B and using 6.37 g. N-(4-tolyl)-5-chlorovaleramide in 100 ml. ethyl alcohol and 10 ml. of an aqueous solution containing 1.36 g. sodium hydroxide there was obtained after recrystallization from hexane 4.43 g. N-(4-tolyl)-2-piperidone; M.P. 88–90° C.

(C) 3,3-dichloro-N-(4-tolyl)-2-piperidone

Following a procedure similar to that described in Example 43C and using 14.6 g. phosphorus pentachloride in 100 ml. xylene and 4.43 g. N-(4-tolyl)-2-piperidone in 125 ml. xylene there was obtained after recrystallization from methyl alcohol 2.37 g. 3,3-dichloro-N-(4-tolyl)-2-piperidone; M.P. 152.5–153.5° C.

EXAMPLE 50

(A) N-[2-chloro-5-(trifluoromethyl)phenyl]-5-chlorovaleramide

Following a procedure similar to that described in Example 43A and using 19.6 g. 2-chloro-5-(trifluoromethyl)-aniline and 12.1 g. triethylamine in 175 ml. dry methylene dichloride and 17.04 g. 5-chlorovaleryl chloride in 125 ml. methylene dichloride there was obtained after recrystallization from ethyl acetate-hexane 16.03 g. N - [2 - chloro - 5 - (trifluoromethyl)phenyl] - 5 - chlorovaleramide; M.P. 80.5–82.0° C.

(B) N-[2-chloro-5-(trifluoromethyl)phenyl]-2-piperidone

Following a procedure similar to that described in Example 43B and using 7.85 g. N[2-chloro-5-(trifluoromethyl)-phenyl]-5-chlorovaleramide in 100 ml. ethyl alcohol and 10 ml. of an aqueous solution containing 1 g. sodium hydroxide there was obtained after recrystallization from hexane 5.68 g. N-[2-chloro-5-(trifluoromethyl)phenyl]-2-piperidone; M.P. 88.5–89.5° C.

(C) 3,3-dichloro-N-[2-chloro-5-(trifluoromethyl) phenyl]-2-piperidone

Following a procedure similar to that described in Example 43C and using 12.77 phosphorus pentachloride in 100 ml. xylene and 5.68 g. N-[2-chloro-5-(trifluoromethyl)phenyl]-2-piperidone in 125 ml. xylene there was obtained after recrystallization from hexane 3.99 g. 3,3-dichloro - N - [2 - chloro-5-(trifluoromethyl)phenyl]-2-piperidone; M.P. 123.5–125° C.

Following a procedure similar to that described in Example 43A but substituting for 4-chloroaniline an equivalent amount of:

(a) 2-naphthylamine
(b) 3-amino-2-chloropyridine
(c) 2-aminobenzothiazole
(d) 1-amino-9-fluorenone
(e) 2-aminofluorene
(f) 5,6,7,8-tetrahydro-1-naphthylamine
(g) 4-chlorobenzylamine
(h) 3-(3-indolyl)propylamine
(i) 4-amino-6-(trifluoromethyl)pyrimidine
(j) 5-bromo-2,4-difluoroaniline there can be obtained respectively:

(a) N-(2-naphthyl)-5-chlorovaleramide
(b) N-(2-chloro-3-pyridyl)-5-chlorovaleramide
(c) N-(2-benzothiazolyl)-5-chlorovaleramide
(d) N-(9-oxo-1-fluorenyl)-5-chlorovaleramide
(e) N-(2-fluorenyl)-5-chlorovaleramide
(f) N-(5,6,7,8-tetrahydro-1-naphthyl)-5-chlorovaleramide
(g) N-(4-chlorobenzyl)-5-chlorovaleramide
(h) N-[3-(3-indolyl)propyl]-5-chlorovaleramide
(i) N-[6-(trifluoromethyl)-4-pyrimidyl]-5-chlorovaleramide
(j) N-(5-bromo-2,4-difluorophenyl)-5-chlorovaleramide Following a procedure similar to that described in Example 43B but substituting for N-(4-chlorophenyl)-5-chlorovaleramide an equivalent amount of the 5-chlorovaleramides listed from (a) to (j) above there can be obtained respectively:

(a) N-(2-naphthyl)-2-piperidone
(b) N-(2-chloro-3-pyridyl)-2-piperidone
(c) N-(2-benzothiazolyl)-2-piperidone
(d) N-(9-oxo-1-fluorenyl)-2-piperidone
(e) N-(2-fluorenyl)-2-piperidone
(f) N-(5,6,7,8-tetrahydro-1-naphthyl)-2-piperidone
(g) N-(4-chlorobenzyl)-2-piperidone
(h) N-[3-(3-indolyl)propyl]-2-piperidone
(i) N-[6-(trifluoromethyl)-4-pyrimidyl]-2-piperidone
(j) N-(5-bromo-2,4-difluorophenyl)-2-piperidone Following a procedure similar to that described in Example 43C but substituting for N-(4-chlorophenyl)-2-piperidone an equivalent amount of the 2-piperidones listed from (a) to (j) above there can be obtained:

(a) 3,3-dichloro-1-(2-naphthyl)-2-piperidone
(b) 3,3-dichloro-1-(2-chloro-3-pyridyl)-2-piperidone
(c) 3,3-dichloro-1-(2-benzothiazolyl)-2-piperidone
(d) 3,3-dichloro-1-(9-oxo-1-fluorenyl)-2-piperidone
(e) 3,3-dichloro-1-(2-fluorenyl)-2-piperidone
(f) 3,3-dichloro-1-(5,6,7,8-tetrahydro-1-naphthyl)-2-piperidone
(g) 3,3-dichloro-1-(4-chlorobenzyl)-2-piperidone
(h) 3,3-dichloro-1-[3-(3-indolyl)propyl]-2-piperidone
(i) 3,3-dichloro-1-[6-(trifluoromethyl)-4-pyrimidyl]-2-piperidone
(j) 3,3-dichloro-1-(5-bromo-2,4-difluorophenyl)-2-piperidone

EXAMPLE 51

(A) N-[4-(trifluoromethyl)phenyl]-6-chlorohexanamide

To a stirred, ice cooled solution of 24.2 g. 4-(trifluoromethyl)aniline and 18.2 g. triethylamine in 400 ml. methylene dichloride was added a solution of 27.05 g. 6-chlorohexanoyl chloride in 250 ml. methylene dichloride during one hour and stirring was continued for two hours. The solution was washed with 5% aqueous sodium carbonate, 1 N hydrochloric acid, and water, dried over calcium sulfate and evaporated to dryness under reduced pressure. The resulting solid residue was recrystallized from benzene-hexane to give 39.8 g. N-[4-trifluoromethyl)phenyl]6-chlorohexanamide; M.P. 100–101° C.

(B) 1-[4-(trifluoromethyl)phenyl]-hexahydro-2H-azepin-2-one

To a stirred solution of 14.7 g. N-[4-(trifluoromethyl)phenyl]-6-chlorohexanamide in 50 ml. dimethyl sulfoxide was added, in one portion, a solution of 6.2 g. potassium tert-butoxide in 50 ml. dimethyl sulfoxide and the resulting solution was heated, in a nitrogen atmosphere, at 55° C. for one hour. The reaction mixture was clenched in 800 ml. ice water containing 2 ml. glacial acetic acid and the resulting mixture was extracted with ether and the extract was washed with cold aqueous sodium bicarbonate and water, dried over calcium sulfate and evaporated to dryness under reduced pressure. A benzene solution of the resulting residue was poured onto a column of 700 g. silica gel prewet with hexane-ethyl acetate (9:1) and the column was eluted with hexane containing increasing amounts of ethyl acetate. The material eluted with hexane-ethyl acetate (1:1) was recrystallized from hexane to give 7.3 g. 1-[4-(trifluoromethyl)phenyl] hexahydro-2H-azepin-2-one; M.P. 86–87° C.

(C) 3,3-dichloro-1-[4-(trifluoromethyl)phenyl]hexahydro-2H-azepin-2-one

A stirred mixture of 12.5 g. phosphorus pentachloride in 75 ml. toluene was heated to 45° C., a solution of 5.1 g. 1-[4-(trifluoromethyl)phenyl]hexahydro-2H-azepin-2-one in 75 ml. toluene was added, and the mixture was heated at 55° C. for two hours. The mixture was evaporated to dryness under reduced pressure and a solution of the resulting residue in benzene was washed with 10% aqueous sodium carbonate and water, dried over calcium sulfate and evaporated to dryness under reduced pressure to give on recrystallization from methyl alcohol-water 2.8 g. 3,3 - dichloro-1-[4-(trifluoromethyl)phenyl]hexahydro-2H-azepin-2-one.

Following a procedure similar to that described in Example 51A but substituting for 4-(trifluoromethyl) aniline an equivalent amount of:

(a) 4-chloro-1-naphthylamine
(b) 2-aminopyridine
(c) 2-amino-4-chlorobenzothiazole
(d) 7-amino-3-methyl-2-nitrofluoren-9-one
(e) 1-aminofluorene
(f) 5,6,7,8-tetrahydro-1-naphthylamine
(g) 6-phenylhexylamine
(h) 3-(2-amino-1-methylethyl)-4-fluoroindole
(i) 2-aminopyrimidine
(j) 4-chloro-2,6-diiodoaniline
(k) dodecamethylenediamine
(l) 2-xylylenediamine
(m) 1,4-phenylenediamine
(n) 2,4'-biphenyldiamine there can be obtained respectively:

(a) N-(4-chloro-1-naphthyl)-6-chlorohexanamide
(b) N-(2-pyridyl)-6-chlorohexanamide (c) N-(4-chloro-2-benzothiazolyl)-6-chlorohexanamide
(d) N-(3-methyl-2-nitro-9-oxo-7-fluorenyl)-6-chloro-hexanamide
(e) N-(1-fluorenyl)-6-chlorohexanamide
(f) N-(5,6,7,8-tetrahydro-1-naphthyl)-6-chlorohexanamide
(g) N-(6-phenylhexyl)-6-chlorohexanamide
(h) N-[2-(4-fluoro-3-indolyl)-2-methylethyl]-6-chlorohexanamide
(i) N-(2-pyrimidyl)-6-chlorohexanamide
(j) N-(4-chloro-2,6-diiodophenyl)-6-chlorohexanamide)
(k) N,N'-dodecamethylene-bis(6-chlorohexanamide)
(l) N,N'-(2-xylylene)bis(6-chlorohexanamide)
(m) N,N'-(1,4-phenylene)bis(6-chlorohexanamide)
(n) N,N'-(2,4'-biphenylylene)bis(6-chlorohexanamide)

Following a procedure similar to that described in Example 51B but substituting for N-[4-(trifluoromethyl)phenyl]-6-chlorohexanamide an equivalent amount of the 6-chlorohexanamides listed from (a) to (n) above there can be obtained respectively:

(a) 1-(4-chloro-1-naphhyl)hexahydro-2H-azepin-2-one
(b) 1-(2-pyridyl)hexahydro-2H-azepin-2-one
(c) 1-(4-chloro-2-benzothiazolyl)hexahydro-2H-azepin-2-one
(d) 1-(3-methyl-2-nitro-9-oxo-7-fluorenyl)hexahydro-2H-azepin-2-one
(e) 1-(1-fluorenyl)hexahydro-2H-azepin-2-one
(f) 1-(5,6,7,8-tetrahydro-1-naphthyl)hexahydro-2H-azepin-2-one
(g) 1-(6-phenylhexyl)hexahydro-2H-azepin-2-one
(h) 1-[2-(4-fluoro-3-indolyl)-2-methylethyl]hexahydro-2H-azepin-2-one
(i) 1-(2-pyrimidyl)hexahydro-2H-azepin-2-one
(j) 1-(4-chloro-2,6-diiodophenyl)hexahydro-2H-azepin-2-one
(k) 1,1'-dodecamethylene-bis(hexahydro-2H-azepin-2-one)
(l) 1,1'-(2-xylylene)bis(hexahydro-2H-azepin-2-one)
(m) 1,1'-(1,4-phenylene)bis(hexahydro-2H-azepin-2-one)
(n) 1,1'-(2,4'-biphenylene)bis(hexahydro-2H-azepin-2-one)

Following a procedure similar to that described in Example 51C but substituting for 1-[4-(trifluoromethyl)phenyl]hexahydro-2H-azepin-2one an equivalent amount of the hexahydro2H-azepin-2-ones listed from (a) to (n) above there can be obtained respectively:

(a) 3,3-dichloro-1-(4-chloro-1-naphthyl)hexahydro-2H-azepin-2-one
(b) 3,3-dichloro-1-(2-pyridyl)hexahydro-2H-azepin-2-one
(c) 3,3-dichloro-1-(4-chloro-2-benzothiazolyl)hexahydro-2H-azepin-2-one
(d) 3,3-dichloro-1-(3-methyl-2-nitro-9-oxo-7-fluorenyl)hexahydro-2H-azepin-2-one
(e) 3,3-dichloro-1-(1-fluorenyl)hexahydro-2H-azepin-2-one
(f) 3,3-dichloro-1-(5,6,7,8-tetrahydro-1-naphthyl)hexahydro-2H-azepin-2-one
(g) 3,3-dichloro-1-(6-phenylhexyl)hexahydro-2H-azepin-2-one
(h) 3,3-dichloro-1-[2-(4-fluoro-3-indolyl)-2-methylethyl]hexahydro-2H-azepin-2-one
(i) 3,3-dichloro-1-(2-pyrimidyl)hexahydro-2H-azepin-2-one
(j) 3,3-dichloro-1-(4-chloro-2,6-diiodophenyl)hexahydro-2H-azepin-2-one
(k) 1,1'-dodecamethylene-bis(3,3-dichlorohexahydro-2H-azepin-2-one)
(l) 1,1'-(2-xylene)bis(3,3-dichlorohexahydro-2H-azepin-2-one)
(m) 1,1'-(1,4-phenylene)bis(3,3-dichlorohexahydro-2H-azepin-2-one)
(n) 1,1'-(2,4'-biphenylylene)bis(3,3-dichlorohexahydro-2H-azepin-2-one)

EXAMPLE 52

(A) N-[2-(trifluoromethyl)phenyl]-6-chlorohexanamide

Following a procedure similar to that described in Example 51A and using 16.1 g. 2-(trifluoromethyl)aniline and 12.2 g. triethylamine in 30 ml. methylene dichloride and 18.6 g. 6-chlorohexanoyl chloride in 150 ml. methylene dichloride there was obtained 23.9 g. of crude material which was filtered through 300 g. aluminum oxide using ether as eluant to give after recrystallization from ether 17.8 g. N-[2 - (trifluoromethyl)-phenyl]-6-chlorohexanamide; M.P. 44.5–46° C.

(B) 1-[2-(trifluoromethyl)phenyl]hexahydro-2H-azepin-2-one

Following a procedure similar to that described in Example 51B and using 26.4 g. N-[2-(trifluoromethyl)phenyl]-6-chlorohexanamide in 100 ml. dimethyl sulfoxide and 11.1 g. potassium tert-butoxide in 85 ml. dimethyl sulfoxide there was obtained after recrystallization from hexane 13.2 g. 1 - [2-(trifluoromethyl)phenyl]hexahydro-2H-azepin-2-one; M.P. 51–53° C.

(C) 3,3-dichloro-1-[2-(trifluoromethyl)phenyl]hexahydro-2H-azepin-2-one

Following a procedure similar to that described in Example 51C and using 62.5 g. phosphorus pentachloride in 350 ml. toluene and 15.4 g. 1-[2-(trifluoromethyl)phenyl]hexahydro - 2H-azepin-2-one in 100 ml. toluene there was obtained after recrystallization from hexane 11.8 g. 3,3 - dichloro - 1-[2-(trifluoromethyl)phenyl]hexahydro-2H-azepin-2-one; M.P. 102–103° C.

EXAMPLE 53

(A) N-(N-methylanilino)-2,2,4-trichlorobutyramide

To a stirred, ice-cooled solution of 12.2 g. 1-methyl-1-phenylhydrazine and 14 ml. triethylamine in 800 ml. methylene dichloride was added 21 g. 2,2,4-trichlorobutyryl chloride in 125 ml. methylene dichloride during fifteen minutes. The methylene chloride solution was washed with dilute aqueous sodium bicarbonate solution and water, dried over sodium sulfate and evaporated to dryness to give 30 g. N-(N-methylanilino)-2,2,4-trichlorobutyramide as an oil.

(B) 3,3-dichloro-1-(N-methylanilino)-2-pyrrolidinone

To a stirred solution of 30 g. N-(N-methylanilino)-2,2,4-trichlorobutyramide from Example 53A in 70 ml. dimethyl sulfoxide was added 13 ml. triethylamine during ten minutes. The solution was diluted with ice-water and extracted with ether. The ether extract was dried over sodium sulfate, filtered through aluminum oxide and evaporated to dryness. Recrystallization of the resulting solid residue from ether-pentane yielded 17.0 g. 3,3-dichloro - 1-(N-methylanilino)-2-pyrrolidinone; M.P. 102–102.5° C.

Following a procedure similar to that described in Example 53A but substituting for 1-methyl-1-phenylhydrazine an equivalent amount of:

(a) 1,1-dibenzylhydrazine
(b) 1-benzyl-1-phenylhydrazine
(c) 1,1-bis(4-chlorophenyl)hydrazine
(d) 1-(2-fluorophenyl)-1-propylhydrazine
(e) 1-(2,6-dichloro-4-methoxyphenyl)-1-phenylhydrazine
(f) 1-phenyl-1-[3-(trifluoromethyl)phenyl]hydrazine
(g) 1,1-dimethylhydrazine
(h) 1-(2-isopropylphenyl)-1-methylhydrazine
(i) 1-[4-(2-ethylbutoxy)phenyl]-1-isopropylhydrazine
(j) 1-(4-hexyloxyphenyl)-1-sec-butylhydrazine
(k) 1-(4-hexylphenyl)-1-ethylhydrazine there can be obtained respectively:

(a) N-(N,N-dibenzylamino)-2,2,4-trichlorobutyramide
(b) N-(N-benzylanilino)-2,2,4-trichlorobutyramide
(c) N-[N-(4-chlorophenyl)-4-chloroanilino]-2,2,4-trichlorobutyramide
(d) N-(N-propyl-2-fluoroanilino)-2,2,4-trichlorobutyramide
(e) N-[N-(2,6-dichloro-4-methoxyphenyl)anilino]-2,2,4-trichlorobutyramide
(f) N-{N-[3-(trifluoromethyl)phenyl]anilino}-2,2,4-trichlorobutyramide
(g) N-(dimethylamino)-2,2,4-trichlorobutyramide
(h) N-(N-methyl-2-isopropylanilino)-2,2,4-trichlorobutyramide
(i) N-[N-isopropyl-4-(2-ethylbutoxy)anilino]-2,2,4-trichlorobutyramide
(j) N-(N-sec-butyl-4-hexyloxyanilino)-2,2,4-trichlorobutyramide
(k) N-(N-ethyl-4-hexylanilino)-2,2,4-trichlorobutyramide The hydrazines listed from (a) to (k) above are known compounds or can be readily prepared from the corresponding amines by nitrosation followed by reduction of the resulting N-nitroso derivative as described hereinbefore. The secondary amine starting compounds are known compounds or can be readily prepared from known primary amines by well known procedures, e.g., N-ethyl-4-hexylaniline can be prepared by condensation of 4-hexylaniline with acetaldehyde followed by catalytic hydrogenation of the resulting Schiff base.

Following a procedure similar to that described in Example 53B above but substituting for N-(N-methylanilino)-2,2,4-trichlorobutyramide the 2,2,4 - trichlorobutyramides listed from (a) to (k) above, there can be obtained respectively:

(a) 3,3-dichloro-1-(N,N-dibenzylamino)-2-pyrrolidinone
(b) 3,3-dichloro-1-(N-benzylanilino)-2-pyrrolidinone
(c) 3,3-dichloro-1-[N-(4-chlorophenyl)-4-chloroanilino]-2-pyrrolidinone
(d) 3,3-dichloro-1-(N-propyl-2-fluoroanilino)-2-pyrrolidinone
(e) 3,3-dichloro-1-[N-(2,6-dichloro-4-methoxyphenyl)anilino]-2-pyrrolidinone
(f) 3,3-dichloro-1-{N-[3-(trifluoromethyl)phenyl]anilino}-2-pyrrolidinone
(g) 3,3-dichloro-1-(dimethylamino)-2-pyrrolidinone
(h) 3,3-dichloro-1-(N-methyl-2-isopropylanilino)-2-pyrrolidinone
(i) 3,3-dichloro-1-[N-isopropyl-4-(2-ethylbutoxy)anilino]-2-pyrrolidinone
(j) 3,3-dichloro-1-(N-sec-butyl-4-hexyloxyanilino)-2-pyrrolidinone
(k) 3,3-dichloro-1-(N-ethyl-4-hexylanilino)-2-pyrrolidinone Following a procedure similar to that described in Example 53A but substituting for 2,2,4-trichlorobutyryl chloride an equivalent amount of 5-chlorovaleryl chloride and for 1 - methyl - 1 - phenylhydrazine an equivalent amount of:

(a) 1-benzyl-1-methylhydrazine
(b) 1-benzyl-1-tert-butylhydrazine
(c) 1-isopropyl-1-phenylhydrazine
(d) 1-methyl-1-(6-nitro-3-tolyl)hydrazine
(e) 1-(4-methoxyphenyl)-1-phenylhydrazine
(f) 1-isopropyl-1-methylhydrazine there can be obtained respectively:

(a) N-(N-benzyl-N-methylamino)-5-chlorovaleramide
(b) N-(N-benzyl-N-tert-butylamino)-5-chlorovaleramide
(c) N-(N-isopropylanilino)-5-chlorovaleramide
(d) N-(N-methyl-6-nitro-3-toluidino)-5-chlorovaleramide
(e) N-[N-(4-methoxyphenyl)anilino]-5-chlorovaleramide
(f) N-(N-isopropyl-N-methylamino)-5-chlorovaleramide Following a procedure similar to that described in Example 43B but substituting for N-(4-chlorophenyl)-5-chlorovaleramide an equivalent amount of the 5-chlorovaleramides from (a) to (f) above there can be obtained respectively:

(a) 1-(N-benzyl-N-methylamino)-2-piperidone
(b) 1-(N-benzyl-N-tert-butylamino)-2-piperidone
(c) 1-(N-isopropylanilino)-2-piperidone
(d) 1-(N-methyl-6-nitro-3-toluidino)-2-piperidone
(e) 1-[N-(4-methoxyphenyl)anilino]-2-piperidone
(f) 1-(N-isopropyl-N-methylamino)-2-piperidone Following a procedure similar to that described in Example 43C but substituting for N-(4-chlorophenyl)-2-piperidone an equivalent amount of the 2-piperidone listed from (a) to (f) above there can be obtained respectively:

(a) 3,3-dichloro-1-(N-benzyl-N-methylamino)-2-piperidone
(b) 3,3-dichloro-1-(N-benzyl-N-tert-butylamino)-2-piperidone
(c) 3,3-dichloro-1-(N-isopropylanilino)-2-piperidone
(d) 3,3-dichloro-1-(N-methyl-6-nitro-3-toluidino)-2-piperidone
(e) 3,3-dichloro-1-[N-(4-methoxyphenyl)anilino]-2-piperidone
(f) 3,3-dichloro-1-(N-isopropyl-N-methylamino)-2-piperidone Following a procedure similar to that described in Example 51A but substituting for 4 - (trifluoromethyl)aniline an equivalent amount of (a) 1-hexyl-1-phenylhydrazine
(b) 1-(3-bromo-4-tolyl)-1-methylhydrazine
(c) 1-(4-ethoxyphenyl)-1-methylhydrazine
(d) 1,1-dihexylhydrazine there can be obtained respectively:

(a) N-(N-hexylanilino)-6-chlorohexanamide
(b) N-(N-methyl-3-bromo-4-toluidino)-6-chlorohexanamide
(c) N-(N-methyl-4-ethoxyanilino)-6-chlorohexanamide
(d) N-(dihexylamino)-6-chlorohexanamide Following a procedure similar to that described in Example 51B but substituting for N-[4-(trifluoromethyl)phenyl]-6-chlorohexanamide an equivalent amount of the 6-chlorohexanamides listed from (a) to (d) above there can be obtained respectively:

(a) 1-(N-hexylanilino)hexahydro-2H-azepin-2-one
(b) 1-(N-methyl-3-bromo-4-toluidino)hexahydro-2H-azepin-2-one
(c) 1-(N-methyl-4-ethoxyanilino)hexahydro-2H-azepin-2-one
(d) 1-(dihexylamino)hexahydro-2H-azepin-2-one Following a procedure similar to that described in Example 51C but substituting for 1-[4-(trifluoromethyl)phenyl]hexahydro - 2H - azepin - 2 - one an equivalent amount of the hexahydro - 2H - azepin-2-ones listed above from (a) to (d) there can be obtained respectively:

(a) 3,3-dichloro-1-(N-hexylanilino)hexahydro-2H-azepin-2-one
(b) 3,3-dichloro-1-(N-methyl-3-bromo-4-toluidino)hexahydro-2H-azepin-2-one
(c) 3,3-dichloro-1-(N-methyl-4-ethoxyanilino)hexahydro-2H-azepin-2-one
(d) 3,3-dichloro-1-(dihexylamino)hexahydro-2H-azepin-2-one

EXAMPLE 54

(A) N-(4-morpholinyl)-2,2,4-trichlorobutyramide

To a stirred, ice cooled mixture of 5.11 g. 4-aminomorpholine in 200 ml. benzene and 5.62 g. sodium carbonate in 50 ml. water was added 10.5 g. 2,2,4-trichlorobutyryl chloride during fifteen minutes and stirring was continued one hour with cooling and an additional hour without cooling. The benzene layer was separated, washed with water, 1 N hydrochloric acid solution, water and dried over calcium sulfate and evaporated to dryness. Crystallization of the residue from hexane yielded 7.85 g. N - (4 - morpholinyl) - 2,2,4 - trichlorobutyramide; M.P. 96–99° C.

(B)

To a stirred solution of 7.85 g. N-(4-morpholinyl)-2,2,4-trichlorobutyramide in 75 ml. ethyl alcohol was added in two equal portions 20 ml. of an aqueous solution containing 1.14 g. sodium hydroxide. Stirring was continued one hour and the solution was allowed to stand fifteen hours, filtered, and evaporated to dryness. The resulting residue was crystallized from hexane to give 2.7 g. 3,3-dichloro - 1 - (4 - morpholinyl)-2-pyrrolidone; M.P. 96–98° C.

Following a procedure similar to that described in Example 54A but substituting for 4-aminomorpholine an equivalent amount of:

(a) N-aminopyrrolidine
(b) 1-amino-4-methylpiperazine there can be obtained respectively:

(a) N-(1-pyrrolidinyl)-2,2,4-trichlorobutyramide
(b) N-(4-methyl-1-piperazinyl)-2,2,4-trichlorobutyramide Following a procedure similar to that described in Example 54B but substituting for N-(4-morpholinyl)-2,2,4-trichlorobutyramide an equivalent amount of the 2,2,4-trichlorobutyramides listed from (a) to (b) above there can be obtained respectively:

(a) 3,3-dichloro-1-(1-pyrrolidinyl)-2-pyrrolidinone
(b) 3,3-dichloro-1-(4-methyl-1-piperazinyl)-2-pyrrolidinone Following a procedure similar to that described in Example 54A but substituting for 2,2,4-trichlorobutyryl chloride an equivalent amount of 5-chlorovaleryl chloride and for 4-aminomorpholine an equivalent amount of:

(a) N-aminopiperidine
(b) 1-amino-4-phenylpiperazine
(c) 4-aminothiomorpholine there can be obtained respectively:

(a) N-(1-piperidyl)-5-chlorovaleramide
(b) N-(4-phenyl-1-piperazinyl)-5-chlorovaleramide
(c) N-(4-thiomorpholinyl)-5-chlorovaleramide Following a procedure similar to that described in Example 54B but substituting for N-(morpholinyl)-2,2,4-trichlorobutyramide an equivalent amount of the 5-chlorovaleramides listed from (a) to (c) above there can be obtained respectively:

(a) N-(1-piperidyl)-2-piperidone
(b) N-(4-phenyl-1-piperazinyl)-2-piperidone
(c) N-(4-thiomorpholinyl)-2-piperidone Following a procedure similar to that described in Example 51C but substituting for 1-[4-(trifluoromethyl)-phenyl]hexahydro-2H-azepin-2-one an equivalent amount of the 2-piperidones listed from (a) to (c) above there can be obtained respectively:

(a) 3,3-dichloro-1-(1-piperidyl)-2-piperidone
(b) 3,3-dichloro-1-(4-phenyl-piperazinyl)-2-piperidone
(c) 3,3-dichloro-1-(4-thiomorpholinyl)-2-piperidone Following a procedure similar to that described in Example 54A but substituting for 2,2,4-trichlorobutyryl chloride an equivalent amount of 6-chlorohexanoyl chloride and for 4-aminomorpholine an equivalent amount of:

(a) 1-amino-4-benzylpiperazine
(b) 1-amino-4-isobutylpiperazine
(c) 1-amino-4-hexylpiperazine there can be obtained respectively:

(a) N-(4-benzyl-1-piperazinyl)-6-chlorohexanamide
(b) N-(4-isobutyl-1-piperazinyl)-6-chlorohexanamide
(c) N-(4-hexyl-1-piperazinyl)-6-chlorohexanamide The 1-aminopiperazines listed from (a) to (c) above can be prepared by nitrosation of N-benzylpiperazine, N-isobutylpiperazine and N-hexylpiperazine respectively followed by reduction of the resulting N-nitroso derivative using the general procedure described hereinbefore.

Following a procedure similar to that described in Example 51B but substituting for N-[4-trifluoromethyl)-phenyl]-6-chlorohexanamide an equivalent amount of the 6-chlorohexamides listed from (a) to (c) above there can be obtained respectively:

(a) 1-(4-benzyl-1-piperazinyl)hexahydro-2H-azepin-2-one
(b) 1-(4-isobutyl-1-piperazinyl)hexahydro-2H-azepin-2-one
(c) 1-(4-hexyl-1-piperazinyl)hexahydro-2H-azepin-2-one Following a procedure similar to that described in Example 51C but substituting for 1-[4-(trifluoromethyl)-phenyl]hexahydro-2H-azepin-2-one an equivalent amount of the hexahydro-2H-azepin-2-one listed from (a) to (c) above there can be obtained respectively:

(a) 3,3-dichloro-1-(4-benzyl-1-piperazinyl)hexahydro-2H-azepin-2-one
(b) 3,3-dichloro-1-(4-isobutyl-1-piperazinyl)hexahydro-2H-azepin-2-one
(c) 3,3-dichloro-1-(4-hexyl-1-piperazinyl)hexahydro-2H-azepin-2-one

EXAMPLE 55

(A) N-(4-chlorophenyl)-6-chlorohexanamide

Following a procedure similar to that described in Example 51A and using 25.5 g. 4-chloroaniline and 24.2 g. triethylamine in 450 ml. methylene dichloride and 37.2 g. 6-chlorohexanoyl chloride in 150 ml. methylene dichloride there was obtained after recrystallization from ethyl acetatehexane 47 g. N-(4-chlorophenyl)-6-chlorohexanamide; M.P. 97–98° C.

(B) 1-(4-chlorophenyl)hexahydride-2H-azepin-2-one

Following a procedure similar to that described in Example 51B and using 10.4 g. N-(4-chlorophenyl)-6-chlorohexanamide in 40 ml. dimethyl sulfoxide and 5.0 g. potassium tert-butoxide in 35 ml. dimethyl sulfoxide there was obtained after recrystallization from hexane-benzene 2.3 g. 1-(4-chlorophenyl)hexahydro-2H-azepin-2-one; M.P. 68–69° C.

(C) 3,3-dichloro-1-(4-chlorophenyl)hexahydro-2H-azepin-2-one

Following a procedure similar to that described in Example 51C and using 6.2 g. phosphorus pentachloride in 50 ml. toluene and 3.3 g. 1-(4-chlorophenyl)hexahydro-2H-azepin-2-one in 25 ml. toluene there was obtained after recrystallization from methyl alcohol-water 1.4 g. 3,3-dichloro-1-(4-chlorophenyl)hexahydro-2H-azepin-2-one; M.P. 132.5–133° C.

I claim:
1. A compound having the formula

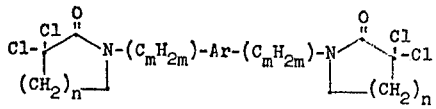

where Ar is phenylene, biphenylylene, or phenylene or biphenylylene substituted by one or two to three of the same or different substituents of the group consisting of halo, lower-alkyl, phenyl-lower-alkyl, lower-alkoxy, phenyl-lower-alkoxy, phenoxy, lower-alkylmercapto, lower-alkylsulfonyl, trihalomethyl, nitro, di(lower-alkyl)-amino, lower-alkanoylamino, amino, lower-alkanoyloxy and hydroxy; $m$, which is the same for each occurrence, is a number from 0 to 3 inclusive; and $n$, which is the same for each occurrence, is a number from 1 to 3 inclusive.

2. A compound according to claim 1 wherein Ar is phenylene or phenylene substituted as defined in claim 1.

3. A compound according to claim 1 where Ar is biphenylylene or biphenylylene substituted as defined in claim 1.

4. 1,1' - (4-xylylene)bis(3,3-dichloro-2-pyrrolidinone) according to claim 2.

5. 1,1' - (2-chloro-1,4-phenylene)bis(3,3-dichloro-2-pyrrolidinone) according to claim 2.

6. 1,1'-(4-chloro - 1,3 - phenylene)bis(3,3-dichloro-2-pyrrrolidinone) according to claim 2.

7. 1,1'-(4-chloro - 1,2 - phenylene)bis(3,3-dichloro-2-pyrrolidinone) according to claim 2.

8. 1,1'-(3,3'-dichloro - 4,4' - biphenylylene)bis(3,3-dichloro-2-pyrrolidinone) according to claim 3.

No references cited

HENRY R. JILES, Primary Examiner

R. T. BOND, Assistant Examiner

U.S. Cl. X.R.

260—256.4 R, 256.5 R, 294.8 C, 295 LB, 304, 305, 268 N, 247.2 A, 243 A, 326.14, 326.12, 326.13, 293.4 G, 234.4 R, 326.3, 326.5 FL, 326.5 FN, 294 A, 294 R, 562 B; 424—251, 263, 270, 274